US008930051B2

(12) United States Patent
Kawai et al.

(10) Patent No.: US 8,930,051 B2
(45) Date of Patent: Jan. 6, 2015

(54) CONTROL DEVICE

(75) Inventors: Hideya Kawai, Anjo (JP); Takashi Yoshida, Anjo (JP); Kohei Tsuda, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 460 days.

(21) Appl. No.: 13/226,044

(22) Filed: Sep. 6, 2011

(65) Prior Publication Data

US 2012/0059542 A1    Mar. 8, 2012

(30) Foreign Application Priority Data

Sep. 6, 2010   (JP) ................................ 2010-199279

(51) Int. Cl.

| B60W 20/00 | (2006.01) |
|---|---|
| B60W 10/02 | (2006.01) |
| B60K 6/48 | (2007.10) |
| B60L 11/14 | (2006.01) |
| B60W 10/06 | (2006.01) |
| B60W 10/08 | (2006.01) |

(52) U.S. Cl.
CPC ................ B60W 10/02 (2013.01); B60K 6/48 (2013.01); B60L 11/14 (2013.01); B60W 10/026 (2013.01); B60W 10/06 (2013.01); B60W 10/08 (2013.01); B60W 20/00 (2013.01); B60W 2510/0275 (2013.01); B60W 2510/0638 (2013.01); B60W 2510/083 (2013.01); B60W 2710/02 (2013.01); B60W 2710/024 (2013.01); B60W 2710/025 (2013.01); Y02T 10/6286 (2013.01); Y02T 10/7077 (2013.01); Y02T 10/6221 (2013.01)
USPC .............. 701/22; 192/30 R; 192/31; 192/54.1

(58) Field of Classification Search
CPC ............ B60K 6/48; B60K 6/00; B60L 11/14; B60W 10/026; B60W 10/08; B60W 20/00; B60W 10/02; B60W 10/06
USPC ............................. 701/22; 192/30 R, 31, 54.1
See application file for complete search history.

(56) References Cited

U.S. PATENT DOCUMENTS 7,101,310 B2 *   9/2006   Smith et al. ..................... 477/98
2005/0284684 A1   12/2005   Tokunou

FOREIGN PATENT DOCUMENTS

| JP | A-2006-014451 | 1/2006 |
|---|---|---|
| JP | A-2006-214514 | 8/2006 |
| JP | A-2008-149907 | 7/2008 |
| JP | A-2008-189102 | 8/2008 |
| JP | A-2010-030429 | 2/2010 |

OTHER PUBLICATIONS

Machine Translation of JP 2007/331534 translated Dec. 18, 2013.*
Viscous Fluid Flow Tasos C. Papanastasiou , Georgios C. Georgiou , and Andreas N. Alexandrou CRC Press 1999 Print ISBN: 978-0-8493-1606-7 eBook ISBN: 978-1-4200-5028-8.*
Nov. 29, 2011 (mail date) Search Report issued in International Application No. PCT/JP2011/070148.

* cited by examiner

*Primary Examiner* — John Q Nguyen
*Assistant Examiner* — Alan D Hutchinson
(74) *Attorney, Agent, or Firm* — Oliff PLC

(57) ABSTRACT

A control device that controls a drive device for a power transfer path, the control device configured with a loss torque estimation section that estimates the value of loss torque due to drag resistance of a first engagement device, with the first engagement device in a disengaged state. A specific-slip hydraulic pressure control section sets a hydraulic pressure to be supplied to a second engagement device such that a transfer torque capacity of the second engagement device becomes a capacity corresponding to estimated input torque, which is determined as a difference between output torque of the rotary electric machine and the estimated loss torque. This is performed in the event that specific slip control, in which the second engagement device is controlled to a slip state from a state with the first engagement device in the disengaged state and with the second engagement device in a completely engaged state, is executed.

9 Claims, 9 Drawing Sheets

CONTROL DEVICE

INCORPORATION BY REFERENCE

The disclosure of Japanese Patent Application No. 2010-199279 filed on Sep. 6, 2010 including the specification, drawings and abstract is incorporated herein by reference in its entirety.

BACKGROUND OF THE INVENTION

The present invention relates to a control device that controls a drive device in which a first engagement device, a rotary electric machine, and a second engagement device are provided on a power transfer path connecting between an input member drivably coupled to an internal combustion engine and an output member drivably coupled to wheels and are arranged in this order from a side of the input member.

DESCRIPTION OF THE RELATED ART

A device disclosed in Japanese Patent Application Publication No. JP-A-2008-189102 below is already known as an example of the control device described above. This control device controls a drive device for a so-called one-motor parallel type hybrid vehicle. In internal combustion engine start control in which the internal combustion engine (engine E in Japanese Patent Application Publication No. JP-A-2008-189102; the same applies hereinafter) is started from a stationary state, the control device according to Japanese Patent Application Publication No. JP-A-2008-189102 controls the second engagement device (second clutch CL2) to a slip state with the first engagement device (first clutch CL1) in a disengaged state to suppress generation of a shock by suppressing variations in torque of the output member. The control device is configured to set the hydraulic pressure to be supplied to the second engagement device such that the transfer torque capacity of the second engagement device becomes a capacity corresponding to the output torque of the rotary electric machine at the start of slip control. In the control device according to Japanese Patent Application Publication No. JP-A-2008-189102, the output torque of the rotary electric machine is set to vehicle required torque or maximum rotary electric machine output torque depending on the relationship of the magnitude of the vehicle required torque and the magnitude of the maximum rotary electric machine output torque (upper limit value of the rotary electric machine output torque). In either case, however, the hydraulic pressure to be supplied to the second engagement device is set in consideration of only the output torque of the rotary electric machine.

Even if the first engagement device is in the disengaged state, however, a torque loss is actually caused by the drag resistance of a fluid, such as air or oil, present around the first engagement device. Therefore, if the hydraulic pressure to be supplied to the second engagement device is set in consideration of only the output torque of the rotary electric machine, the magnitude of torque actually input to an input-side rotary member of the second engagement device becomes smaller than the transfer torque capacity of the second engagement device by an amount corresponding to the above torque loss, which causes an issue that the slip state of the second engagement device may not be established appropriately or that the establishment of the slip state of the second engagement device may be delayed.

SUMMARY OF THE INVENTION

In view of the foregoing, it is desirable to provide a control device in which a slip state of a second engagement device can be established early and appropriately in controlling the second engagement device to the slip state with a first engagement device in a disengaged state.

According to an aspect of the present invention, a control device that controls a drive device in which a first engagement device, a rotary electric machine, and a second engagement device are provided on a power transfer path connecting between an input member drivably coupled to an internal combustion engine and an output member drivably coupled to wheels and are arranged in this order from a side of the input member. The control device includes: a loss torque estimation section that derives estimated loss torque, which is an estimated value of loss torque due to drag resistance of the first engagement device, with the first engagement device in a disengaged state; and a specific-slip hydraulic pressure control section that sets a hydraulic pressure to be supplied to the second engagement device such that a transfer torque capacity of the second engagement device becomes a capacity corresponding to estimated input torque, which is determined as a difference between output torque of the rotary electric machine and the estimated loss torque, in the case where specific slip control, in which the second engagement device is controlled to a slip state from a state with the first engagement device in the disengaged state and with the second engagement device in a completely engaged state, is executed.

The term "drivably coupled" means a state in which two rotary elements are coupled to each other in such a way that allows transfer of a drive force, including a state in which the two rotary elements are coupled to each other so as to rotate together with each other, and a state in which the two rotary elements are coupled to each other via one or two or more transmission members in such a way that allows transfer of a drive force. Examples of such transmission members include various members that transfer rotation at an equal speed or a changed speed, such as a shaft, a gear mechanism, a belt, and a chain. Additional examples of such transmission members include engagement devices that selectively transfer rotation and a drive force, such as a friction clutch and a meshing type clutch.

The term "rotary electric machine" refers to any of a motor (electric motor), a generator (electric generator), and a motor generator that functions as both a motor and a generator as necessary.

Of the various states of an engagement device, the "completely engaged state" means a state in which the engagement device is engaged with one rotary member and the other rotary member of the engagement device rotatable together with each other. The "slip state" means a state in which the engagement device is engaged with a predetermined difference in rotational speed provided between the one rotary member and the other rotary member of the engagement device. The "disengaged state" means a state in which no rotation or drive force is transferred between the one rotary member and the other rotary member of the engagement device.

According to the above configuration, the specific-slip hydraulic pressure control section sets a hydraulic pressure to be supplied to the second engagement device such that a transfer torque capacity of the second engagement device becomes a capacity corresponding to estimated input torque, which is determined as a difference between output torque of the rotary electric machine and the estimated loss torque in the case where specific slip control is executed. Thus, the slip state of the second engagement device can be easily established by reducing the transfer torque capacity of the second engagement device to be less than the output torque of the rotary electric machine in consideration of the estimated loss torque due to the drag resistance of the first engagement device when the specific slip control is executed.

That is, the slip state of the second engagement device can be established immediately by reducing the transfer torque capacity of the second engagement device to be less than the output torque of the rotary electric machine, depending on the relationship with the magnitude of the actual torque input to the second engagement device. Even if the slip state of the second engagement device is not established at the very time point, for example, the slip state of the second engagement device can be established early by thereafter decreasing the hydraulic pressure to be supplied to the second engagement device. Thus, in either case, the slip state of the second engagement device can be established early and appropriately in controlling the second engagement device to the slip state with the first engagement device in the disengaged state.

In the specific slip control, the specific-slip hydraulic pressure control section may reduce the hydraulic pressure to be supplied to the second engagement device to an initial hydraulic pressure corresponding to the estimated input torque, and thereafter reduce the hydraulic pressure to be supplied to the second engagement device from the initial hydraulic pressure at a constant time variation rate until a difference in rotational speed between one rotary member and the other rotary member of the second engagement device becomes a predetermined value.

According to this configuration, the specific-slip hydraulic pressure control section reduces the hydraulic pressure to be supplied to the second engagement device to the initial hydraulic pressure corresponding to the estimated input torque. Thus, in the specific slip control, first, the transfer torque capacity of the second engagement device can be appropriately adjusted to a capacity corresponding to the estimated input torque. Thereafter, the specific-slip hydraulic pressure control section reduces the hydraulic pressure to be supplied to the second engagement device from the initial hydraulic pressure at a constant time variation rate. Thus, the slip state of the second engagement device can be established early and appropriately.

The control device may be configured to be capable of executing internal combustion engine start control, in which the internal combustion engine is started using torque of the rotary electric machine, while executing the specific slip control with the internal combustion engine in a stationary state, and the specific-slip hydraulic pressure control section may raise the hydraulic pressure to be supplied to the second engagement device so as to increase the transfer torque capacity of the second engagement device by a capacity corresponding to the estimated loss torque during the internal combustion engine start control after a rotational speed of the input member starts rising and before the rotational speed of the input member and a rotational speed of the rotary electric machine become equal to each other.

According to this configuration, the internal combustion engine start control is executed while executing the specific slip control described above. Thus, generation of a shock can be suppressed by suppressing variations in torque of the output member due to torque generated by initial explosion at the start of the internal combustion engine or the like.

During the specific slip control, at the time point when the second engagement device starts slipping, the transfer torque capacity of the second engagement device is balanced against the difference between the output torque of the rotary electric machine and the actual torque loss (including loss torque due to frictional resistance, the actual loss torque due to the drag resistance of the first engagement device, and so forth). In this state, in the case where the first engagement device is brought into the completely engaged state so that the actual drag resistance of the first engagement device is completely canceled after the start of the internal combustion engine, the magnitude of torque actually input to the input-side rotary member of the second engagement device may become more than the transfer torque capacity of the second engagement device by at least a value corresponding to the actual loss torque due to the drag resistance of the first engagement device, which may excessively raise the respective rotational speeds of the input member drivably coupled to the internal combustion engine and the rotary electric machine.

In this respect, according to the above configuration, the hydraulic pressure to be supplied to the second engagement device is raised in accordance with the magnitude of the estimated loss torque after the start of the internal combustion engine and after the rotational speed of the input member starts rising and before the input member and the rotary electric machine are synchronized with each other. Thus, an excessive rise in respective rotational speeds of the input member and the rotary electric machine can be suppressed.

The specific-slip hydraulic pressure control section may raise the hydraulic pressure to be supplied to the second engagement device at a constant time variation rate for a predetermined period at and after a time point when the rotational speed of the input member starts rising.

According to this configuration, the transfer torque capacity of the second engagement device can be raised at a constant time variation rate for a predetermined period after the rotational speed of the input member starts rising. Hence, generation of a shock can be effectively suppressed by gently varying the magnitude of torque to be transferred to the output member side via the second engagement device when the hydraulic pressure to be supplied to the second engagement device is raised in accordance with the magnitude of the estimated loss torque.

The loss torque estimation section may derive the estimated loss torque on the basis of at least one of a temperature of a fluid in which the first engagement device is immersed and a rotational speed difference between the rotational speed of the input member and the rotational speed of the rotary electric machine.

According to this configuration, the temperature of the fluid in which the first engagement device is immersed and the rotational speed difference between the rotational speed of the input member and the rotational speed of the rotary electric machine can be set as indices that may affect the magnitude of the estimated loss torque to appropriately derive the estimated loss torque on the basis of these indices.

Note that the loss torque estimation section may derive the estimated loss torque on the basis of both the indices, because this makes it possible to derive the estimated loss torque with higher accuracy.

Specifically, the estimated loss torque may be set to become higher as the temperature of the fluid in which the first engagement device is immersed becomes lower.

As the temperature of the fluid in which the first engagement device is immersed becomes lower, the viscosity of the fluid becomes higher, and therefore the loss torque due to the drag resistance of the first engagement device becomes higher. According to this configuration, the magnitude of the estimated loss torque can be set appropriately in accordance with the temperature of the fluid in which the first engagement device is immersed.

Also, the estimated loss torque may be set to become higher as the rotational speed difference becomes larger.

As the rotational speed difference between the rotational speed of the input member and the rotational speed of the rotary electric machine becomes larger, the shearing resistance of the fluid becomes higher, and therefore the loss torque due to the drag resistance of the first engagement device becomes higher. According to this configuration, the magnitude of the estimated loss torque can be set appropriately in accordance with the rotational speed difference.

DETAILED DESCRIPTION OF THE EMBODIMENTS

1. First Embodiment

Figure 1:
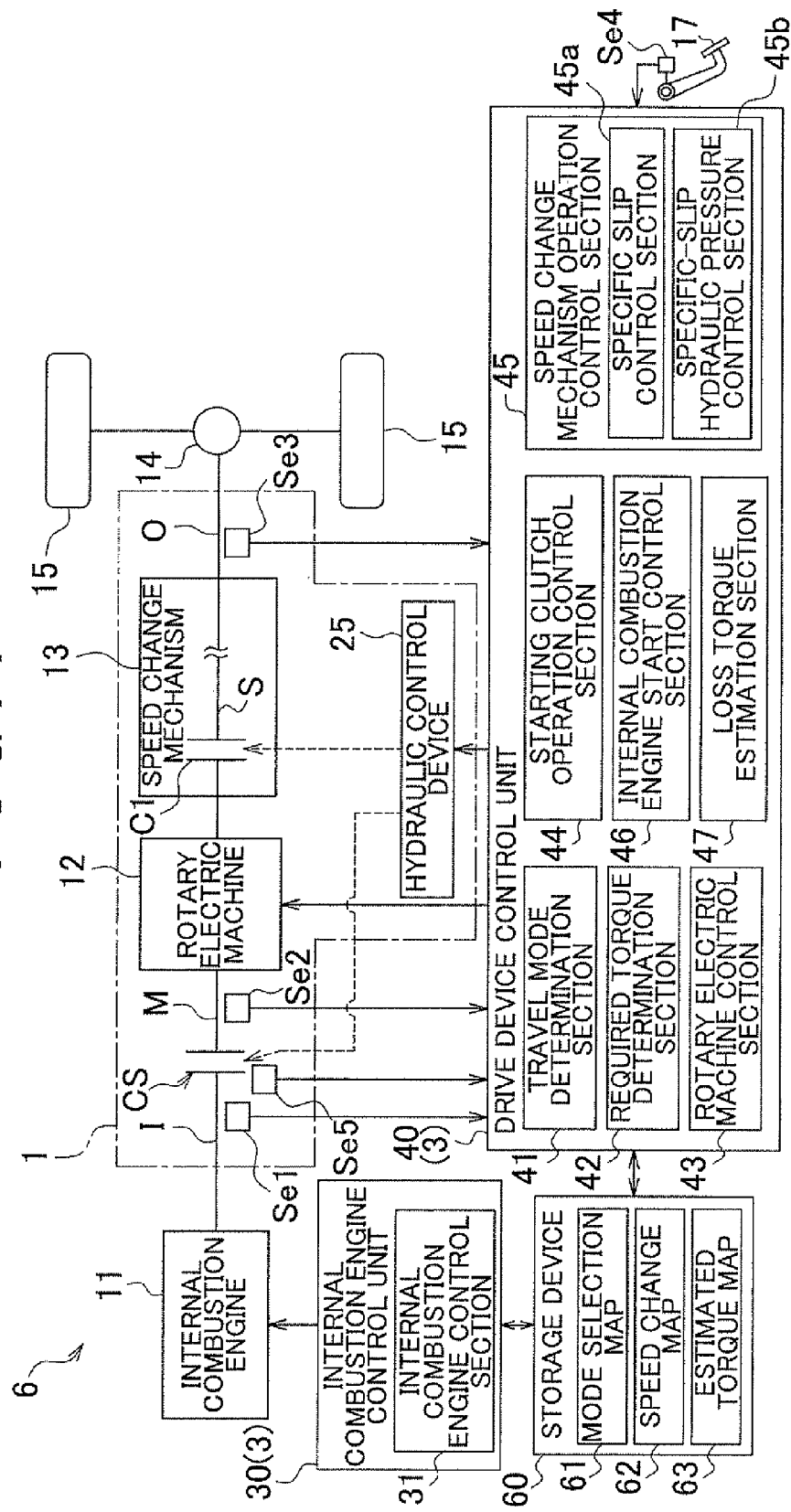
FIG. 1 is a schematic diagram showing the schematic configuration of a drive device and a control device for the drive device according to a first embodiment.

A control device according to a first embodiment of the present invention will be described with reference to the drawings. A control device 3 according to the embodiment is a control device for a drive device that controls a drive device 1. Here, the drive device 1 according to the embodiment is a drive device for a hybrid vehicle that drives a hybrid vehicle 6 (hereinafter simply referred to as "vehicle 6") including both an internal combustion engine 11 and a rotary electric machine 12 each serving as a drive force source. The control device 3 according to the embodiment will be described in detail below.

1-1. Configuration of Drive Device

First, the configuration of the drive device 1 to be controlled by the control device 3 according to the embodiment will be described. The drive device 1 according to the embodiment is formed as a drive device for a so-called one-motor parallel type hybrid vehicle. As shown in FIG. 1, the drive device 1 according to the embodiment includes a starting clutch CS, the rotary electric machine 12, and a speed change mechanism 13, which are provided on a power transfer path connecting between an input shaft I drivably coupled to the internal combustion engine 11 and an output shaft O drivably coupled to wheels 15 and are arranged in this order from the side of the input shaft I. The starting clutch CS, the rotary electric machine 12, and the speed change mechanism 13 are disposed coaxially with each other. The speed change mechanism 13 includes a first clutch C1 for shifting as discussed later. Thus, the starting clutch CS, the rotary electric machine 12, and the first clutch 13 are provided on the power transfer path connecting between the input shaft I and the output shaft O, and arranged in this order from the side of the input member I. These components are housed in a case (drive device case). In the embodiment, the input shaft I corresponds to the "input member" according to the present invention, and the output shaft O corresponds to the "output member" according to the present invention.

The internal combustion engine 11 is a motor driven by combusting fuel inside the engine to take out power. Various engines known in the art such as a gasoline engine and a diesel engine, for example, may be used as the internal combustion engine 11. The internal combustion engine 11 is drivably coupled to the input shaft I so as to rotate together with the input shaft I. In the embodiment, an output shaft, such as a crankshaft, of the internal combustion engine 11 is drivably coupled to the input shaft I. It is also suitable that the internal combustion engine 11 is drivably coupled to the input shaft I via a damper or other devices. The internal combustion engine 11 is drivably coupled to the rotary electric machine 12 via the starting clutch CS.

The starting clutch CS is a friction engagement device provided between the internal combustion engine 11 and the rotary electric machine 12 to selectively drivably couple the input shaft I, which rotates together with the internal combustion engine 11, and an intermediate shaft M, which rotates together with a rotor of the rotary electric machine 12. In the embodiment, the starting clutch CS is formed as a wet multi-plate clutch. In the embodiment, the starting clutch CS is disposed in a housing (clutch housing) that surrounds the starting clutch CS oil-tightly, and basically immersed in oil in the housing at all times. More specifically, the starting clutch CS includes a plurality of friction plates, and is disposed with generally the entirely of the plurality of friction plates immersed in the oil supplied to the starting clutch CS. The oil is discharged by an oil pump (not shown) to be supplied to various components of the drive device 1, and functions as a lubricating/cooling liquid that lubricates and/or cools the components supplied with the liquid. In the embodiment, generally the entirety of the plurality of friction plates is immersed in oil at all times, which makes it possible to maintain favorable cooling performance for the starting clutch CS. In the embodiment, the starting clutch CS corresponds to the "first engagement device" according to the present invention. Also, the oil corresponds to the "fluid" according to the present invention.

The rotary electric machine 12 includes the rotor and a stator (not shown), and can function both as a motor (electric motor) that is supplied with electric power to generate power and as a generator (electric generator) that is supplied with power to generate electric power. The rotor of the rotary electric machine 12 is drivably coupled to the intermediate shaft M so as to rotate together with the intermediate shaft M. The rotary electric machine 12 is electrically connected to an electricity accumulation device (not shown). A battery, a capacitor, or the like may be used as the electricity accumulation device. In the embodiment, a battery is used as the electricity accumulation device. The rotary electric machine 12 is supplied with electric power from the battery to perform power running, or supplies electric power generated using torque (the term "torque" is used herein as a synonym for "drive force") output from the internal combustion engine 11 or an inertial force of the vehicle 6 to the battery to accumulate the electric power. The intermediate shaft M, which rotates together with the rotor of the rotary electric machine 12, is drivably coupled to the speed change mechanism 13. That is, the intermediate shaft M serves as an input shaft (transmission input shaft) of the speed change mechanism 13.

In the embodiment, the speed change mechanism 13 is a stepped automatic transmission that provides a plurality of shift speeds with different speed ratios. In order to provide the plurality of shift speeds, the speed change mechanism 13 includes one or two or more gear mechanisms, such as a planetary gear mechanism, and a plurality of friction engagement devices, such as clutches and brakes, that engage and disengage rotary elements of the gear mechanisms to switch between the shift speeds. Here, the speed change mechanism 13 includes the first clutch C1 serving as one of the plurality of friction engagement devices for shifting. In the embodiment, the first clutch C1 is formed as a wet multi-plate clutch. The first clutch C1 is provided to selectively drivably couple the intermediate shaft M and a transmission intermediate shaft S provided in the speed change mechanism 13 to each other. In the embodiment, the first clutch C1 corresponds to the "second engagement device" according to the present invention. The transmission intermediate shaft S is drivably coupled to the output shaft O via other friction engagement devices or a shaft member in the speed change mechanism 13.

The speed change mechanism 13 transfers rotation of the intermediate shaft M to the output shaft O while changing the rotational speed with a predetermined speed ratio set for each shift speed and converting torque. The torque transferred from the speed change mechanism 13 to the output shaft O is distributed and transferred to the two, left and right, wheels 15 via an output differential gear device 14. This causes the vehicle 6 to travel.

In the embodiment, the drive device 1 includes an oil pump (not shown) drivably coupled to the intermediate shaft M. The oil pump functions as a hydraulic pressure source that sucks oil accumulated in an oil pan (not shown) to supply the oil to various components of the drive device 1. The oil pump is actuated by being driven by a drive force of one or both of the rotary electric machine 12 and the internal combustion engine 11 transmitted via the intermediate shaft M to generate a hydraulic pressure by discharging oil. The pressurized oil from the oil pump is regulated to a predetermined hydraulic pressure by a hydraulic control device 25 to be supplied to the starting clutch CS, the first clutch C1 provided in the speed change mechanism 13, and so forth.

1-2. Configuration of Control Device

Next, the configuration of the control device 3 according to the embodiment will be described. As shown in FIG. 1, the control device 3 according to the embodiment includes an internal combustion engine control unit 30 that mainly controls the internal combustion engine 11, and a drive device control unit 40 that mainly controls the rotary electric machine 12, the starting clutch CS, and the speed change mechanism 13. The internal combustion engine control unit 30 and the drive device control unit 40 function as a core member that performs operation control of various components of the drive device 1.

Each of the internal combustion engine control unit 30 and the drive device control unit 40 includes an arithmetic processing unit such as a CPU serving as a core member, a storage device such as a RAM and a ROM, and so forth (not shown). Various functional sections of the internal combustion engine control unit 30 and the drive device control unit 40 are formed by software (a program) stored in the ROM or the like, hardware such as a separately provided arithmetic circuit, or a combination of both. These functional sections are configured to exchange information between each other. Further, the internal combustion engine control unit 30 and the drive device control unit 40 are configured to exchange information between each other.

As shown in FIG. 1, the control device 3 is configured to be capable of acquiring information from a plurality of sensors provided at various locations in the vehicle 6 incorporating the drive device 1, specifically an input shaft rotational speed sensor Se1, an intermediate shaft rotational speed sensor Se2, a vehicle speed sensor Se3, an accelerator operation amount detection sensor Se4, and an oil temperature detection sensor Se5. The input shaft rotational speed sensor Se1 is a sensor that detects the rotational speed of the input shaft I. The rotational speed of the input shaft I detected by the input shaft rotational speed sensor Se1 is equal to the rotational speed of the internal combustion engine 11. The intermediate shaft rotational speed sensor Se2 is a sensor that detects the rotational speed of the intermediate shaft M. The rotational speed of the intermediate shaft M detected by the intermediate shaft rotational speed sensor Se2 is equal to the rotational speed of the rotary electric machine 12. The vehicle speed sensor Se3 is a sensor that detects the vehicle speed. In the embodiment, the vehicle speed sensor Se3 detects the rotational speed of the output shaft O to detect the vehicle speed. The accelerator operation amount detection sensor Se4 is a sensor that detects the amount of operation of an accelerator pedal 17 to detect the accelerator operation amount. The oil temperature detection sensor Se5 is a sensor that detects the temperature of oil to be supplied to the starting clutch CS. Information indicating the detection results of the sensors Se1 to Se5 is output to the internal combustion engine control unit 30 and the drive device control unit 40.

The internal combustion engine control unit 30 includes an internal combustion engine control section 31.

The internal combustion engine control section 31 is a functional section that performs operation control of the internal combustion engine 11. The internal combustion engine control section 31 determines control targets for output torque (internal combustion engine torque Te) and the rotational speed of the internal combustion engine 11 and drives the internal combustion engine 11 in accordance with the determined control targets to perform operation control of the internal combustion engine 11. In the embodiment, the internal combustion engine control section 31 determines, of vehicle required torque Td determined by a required torque determination section 42 discussed later, internal combustion engine required torque to be carried by the internal combustion engine 11. Then, the internal combustion engine control section 31 controls the internal combustion engine torque Te on the basis of the determined internal combustion engine required torque.

The drive device control unit 40 includes a travel mode determination section 41, the required torque determination section 42, a rotary electric machine control section 43, a starting clutch operation control section 44, a speed change mechanism operation control section 45, an internal combustion engine start control section 46, and a loss torque estimation section 47.

The travel mode determination section 41 is a functional section that determines the travel mode of the vehicle 6. The travel mode determination section 41 determines the travel mode to be established by the drive device 1 on the basis of, for example, the vehicle speed detected by the vehicle speed sensor Se3, the accelerator operation amount detected by the accelerator operation amount detection sensor Se4, the battery charge amount detected by a battery state detection sensor (not shown), and so forth. At this time, the travel mode determination section 41 references a mode selection map 61 stored in a storage device 60 such as a memory and defining the relationship between the vehicle speed, the accelerator operation amount, and the battery charge amount, and the travel mode.

When the vehicle 6 is traveling normally, for example, a parallel mode is selected. In the parallel mode, the starting clutch CS is brought into the completely engaged state, and the vehicle 6 is driven with at least the internal combustion engine torque Te transferred to the wheels 15 via the output shaft O. At this time, the rotary electric machine 12 outputs torque as required to supplement a drive force due to the internal combustion engine torque Te. When the vehicle 6 is starting, for example, an electric power travel mode is selected. In the electric power travel mode, the starting clutch CS is brought into the disengaged state, and the vehicle 6 is driven by only the output torque (rotary electric machine torque Tm) of the rotary electric machine 12. The modes described here are merely illustrative, and a configuration including various other modes may be adopted. In the embodiment, it is determined that internal combustion engine start conditions are met in the case where the rotary electric machine torque Tm falls short with respect to the vehicle required torque Td, the battery charge amount decreases to a predetermined value or less, or the like during travel in the electric power travel mode, for example. When the internal combustion engine start conditions are met, internal combustion engine start control discussed later can be executed to shift from the electric power travel mode to the parallel mode.

The required torque determination section 42 is a functional section that determines the vehicle required torque Td which is required to drive the vehicle 6. The required torque determination section 42 determines the vehicle required torque Td, for example by referencing a predetermined map (not shown), on the basis of the vehicle speed detected by the vehicle speed sensor Se3 and the accelerator operation amount detected by the accelerator operation amount detection sensor Se4. The vehicle required torque Td determined by the required torque determination section 42 is output to the internal combustion engine control section 31 and the rotary electric machine control section 43.

The rotary electric machine control section 43 is a functional section that performs operation control of the rotary electric machine 12. The rotary electric machine control section 43 determines control targets for the rotary electric machine torque Tm and the rotational speed of the rotary electric machine 12 and drives the rotary electric machine 12 in accordance with the determined control targets to perform operation control of the rotary electric machine 12. In the embodiment, the rotary electric machine control section 43 determines rotary electric machine required torque, of the vehicle required torque Td determined by the required torque determination section 42, to be carried by the rotary electric machine 12. Then, the rotary electric machine control section 43 controls the rotary electric machine torque Tm on the basis of the determined rotary electric machine required torque. Through cooperation between the internal combustion engine control section 31 and the rotary electric machine control section 43, the operations of the internal combustion engine 11 and the rotary electric machine 12 are controlled such that the total of the internal combustion engine torque Te and the rotary electric machine torque Tm becomes equal to the vehicle required torque Td.

The starting clutch operation control section 44 is a functional section that controls an operation of the starting clutch CS. Here, the starting clutch operation control section 44 controls the hydraulic pressure to be supplied to the starting clutch CS via the hydraulic control device 25 to control the operation of the starting clutch CS. For example, the starting clutch operation control section 44 adjusts the hydraulic pressure to be supplied to the starting clutch CS to a pressure that is equal to or less than a stroke end pressure to bring the starting clutch CS into the disengaged state. Also, the starting clutch operation control section 44 adjusts the hydraulic pressure to be supplied to the starting clutch CS to a complete engagement pressure to bring the starting clutch CS into the completely engaged state. Here, the term "stroke end pressure" refers to a pressure at which the starting clutch CS is in a state immediately before it starts slipping with forces acting on both sides of a piston of the starting clutch CS balanced against each other, and the term "complete engagement pressure" refers to a pressure at which the starting clutch CS is constantly in the completely engaged state (the same applied to other engagement devices hereinafter).

In addition, the starting clutch operation control section 44 adjusts the hydraulic pressure to be supplied to the starting clutch CS to a pressure (partial engagement pressure) that is more than the stroke end pressure and less than the complete engagement pressure to bring the starting clutch CS into a partially engaged state. Here, the term "partially engaged state" refers to a state between the disengaged state and the completely engaged state and after the start of engagement and before the establishment of complete engagement. With the starting clutch CS in the partially engaged state, a drive force is transferred between the input shaft I and the intermediate shaft M with the input shaft I and the intermediate shaft M rotatable relative to each other. That is, with the starting clutch CS in the partially engaged state, torque can be transferred with the starting clutch CS in the slip state (with the starting clutch CS slipping). The magnitude of torque that can be transferred by the starting clutch CS in the completely engaged state or the partially engaged state is determined in accordance with the engagement pressure of the starting clutch CS at the time point. The magnitude of torque at this time is defined as "transfer torque capacity Tcs" of the starting clutch CS. In the embodiment, increase and decrease in transfer torque capacity Tcs can be continuously controlled by continuously controlling the magnitudes of the amount of oil and the hydraulic pressure to be supplied to the starting clutch CS through a proportional solenoid or the like. The direction of torque transferred by the starting clutch CS in the slip state is determined in accordance with the direction of relative rotation between the input shaft I and the intermediate shaft M.

The speed change mechanism operation control section 45 is a functional section that controls an operation of the speed change mechanism 13. The speed change mechanism operation control section 45 determines a target shift speed on the basis of the accelerator operation amount and the vehicle speed, and controls the speed change mechanism 13 so as to establish the determined target shift speed. At this time, the speed change mechanism operation control section 45 references a speed change map 62 stored in the storage device 60 and defining the relationship between the vehicle speed and the accelerator operation amount and the target shift speed. The speed change map 62 is a map (not shown) in which schedules for shifting are set on the basis of the accelerator operation amount and the vehicle speed. The speed change mechanism operation control section 45 controls the hydraulic pressure to be supplied to a predetermined friction engagement device provided in the speed change mechanism 13 on the basis of the determined target shift speed to establish the target shift speed. In the case where the determined target shift speed is changed, the speed change mechanism operation control section 45 interchanges the respective engagement states of two predetermined engagement devices to switch the shift speed to be established. Such speed change control is executed in both the parallel mode and the electric power travel mode discussed above.

As described above, the speed change mechanism 13 includes the first clutch C1. The first clutch C1 establishes a first speed in the engaged state, for example, in cooperation with a one-way clutch. As a matter of course, the first clutch C1 is controlled by the speed change mechanism operation control section 45. The speed change mechanism operation control section 45 controls the hydraulic pressure to be supplied to the first clutch C1 via the hydraulic control device 25 to control the operation of the first clutch C1. For example, the speed change mechanism operation control section 45 adjusts the hydraulic pressure to be supplied to the first clutch C1 to a pressure that is equal to or less than a stroke end pressure to bring the first clutch C1 into the disengaged state. Also, the speed change mechanism operation control section 45 adjusts the hydraulic pressure to be supplied to the first clutch C1 to a complete engagement pressure to bring the first clutch C1 into the completely engaged state.

In addition, the speed change mechanism operation control section 45 adjusts the hydraulic pressure to be supplied to the first clutch C1 to a pressure (partial engagement pressure) that is more than the stroke end pressure and less than the complete engagement pressure to bring the first clutch C1 into a partially engaged state. With the first clutch C1 in the partially engaged state, a drive force is transferred between the intermediate shaft M and the transmission intermediate shaft S with the intermediate shaft M and the transmission intermediate shaft S rotatable relative to each other. That is, with the first clutch C1 in the partially engaged state, torque can be transferred with the first clutch C1 in the slip state (with the first clutch C1 slipping). The magnitude of torque that can be transferred by the first clutch C1 in the completely engaged state or the partially engaged state is determined in accordance with the engagement pressure of the first clutch C1 at the time point. The magnitude of torque at this time is defined as "transfer torque capacity Tc1" of the first clutch C1. In the embodiment, increase and decrease in transfer torque capacity Tc1 can be continuously controlled by continuously controlling the magnitudes of the amount of oil and the hydraulic pressure to be supplied to the first clutch C1 through a proportional solenoid or the like. The direction of torque transferred by the first clutch C1 in the slip state is determined in accordance with the direction of relative rotation between the intermediate shaft M and the transmission intermediate shaft S.

The speed change mechanism operation control section 45 according to the embodiment includes a specific slip control section 45a that executes predetermined specific slip control. Here, in the embodiment, the term "specific slip control" refers to control in which the first clutch C1 is brought into the slip state from a state with the starting clutch CS in the disengaged state and with the first clutch C1 in the completely engaged state. Such specific slip control may be executed in the case where the speed change control or the internal combustion engine start control is executed during travel in the electric power travel mode and with the starting clutch CS in the disengaged state, for example. That is, when the target shift speed is changed and the respective engagement states of two engagement devices including the first clutch C1 are interchanged to switch the shift speed to be established in the speed change mechanism 13 in the speed change control during travel on electricity, the specific slip control section 45a brings the first clutch C1 into the slip state in torque phase while maintaining the starting clutch CS in the disengaged state. During the internal combustion engine start control, meanwhile, the specific slip control section 45a brings the first clutch C1 into the slip state while maintaining the starting clutch CS in the disengaged state in order to suppress generation of a shock by suppressing variations in torque of the output shaft O due to torque generated by initial explosion at the start of the internal combustion engine 11 or the like. When the specific slip control is executed, the specific slip control section 45a controls the hydraulic pressures to be supplied to the starting clutch CS and the first clutch C1 via the starting clutch operation control section 44 and the speed change mechanism operation control section 45.

Here, an overview of a basic form of the specific slip control will be described. First, the specific slip control section 45a maintains a hydraulic pressure command value Pcs for the starting clutch CS at a magnitude of the stroke end pressure or less via the starting clutch operation control section 44. The hydraulic pressure to be supplied to the starting clutch CS is maintained at the stroke end pressure or less in accordance with the hydraulic pressure command value Pcs. This allows the transfer torque capacity Tcs of the starting clutch CS to be maintained at zero. Meanwhile, the specific slip control section 45a reduces the hydraulic pressure command value Pc1 for the first clutch C1 from the complete engagement pressure to an initial value corresponding to the rotary electric machine torque Tm via the speed change mechanism operation control section 45. Here, the internal combustion engine torque Te is zero during the specific slip control. Thus, the rotary electric machine torque Tm is determined in accordance with the vehicle required torque Td. However, in the case where the vehicle required torque Td is more than the maximum value (referred to as "maximum rotary electric machine torque Tmmax" herein) of torque that can be output from the rotary electric machine 12, the rotary electric machine torque Tm is set to the maximum rotary electric machine torque Tmmax. That is, the rotary electric machine torque Tm is set to the smaller one of the vehicle required torque Td and the maximum rotary electric machine torque Tmmax.

Thereafter, the specific slip control section 45a reduces the hydraulic pressure command value Pc1 for the first clutch C1 from the above initial value at a constant time variation rate while maintaining the rotary electric machine torque Tm. The hydraulic pressure to be supplied to the first clutch C1 varies in accordance with the hydraulic pressure command value Pc1, and the transfer torque capacity Tc1 of the first clutch C1 gradually decreases from the capacity corresponding to the rotary electric machine torque Tm. As a result of the decrease in transfer torque capacity Tc1, the first clutch C1 starts slipping. When the first clutch C1 is brought into the slip state, the control for the rotary electric machine 12 is switched to rotational speed control. In the rotational speed control for the rotary electric machine 12, the rotational speed of the rotary electric machine 12 is controlled such that a predetermined rotational speed difference is generated between the input shaft I and the intermediate shaft M on both sides of the first clutch C1. In this way, the specific slip control section 45a brings the first clutch C1 into the slip state with the starting clutch CS in the disengaged state.

In the specific slip control according to the present invention, it is only necessary that the starting clutch CS should be maintained in the disengaged state at least until the first clutch C1 starts slipping. That is, after the first clutch C1 starts slipping, the starting clutch CS may be maintained in the disengaged state as it has been or may be shifted to the completely engaged state through the partially engaged state.

The internal combustion engine start control section 46 is a functional section that performs internal combustion engine start control, in which the internal combustion engine 11 is started using torque (rotary electric machine torque Tm) of the rotary electric machine 12, with the internal combustion engine 11 in the stationary state. At the start of the internal combustion engine start control, the internal combustion engine 11 is started using part of the rotary electric machine torque Tm with the specific slip control section 45a executing the specific slip control discussed above. By executing the internal combustion engine start control with the first clutch C1 in the slip state, the direction of torque transfer via the first clutch C1 can be maintained in a constant direction (here, the direction from the intermediate shaft M side to the output shaft O side) without being affected by variations in rotational speed of the intermediate shaft M at the start of the internal combustion engine 11. Thus, generation of a shock can be suppressed.

In the specific slip control, the specific slip control section 45a adjusts the hydraulic pressure to be supplied to the starting clutch CS to be less than the stroke end pressure of the starting clutch CS, and reduces the hydraulic pressure to be supplied to the first clutch C1 from the complete engagement pressure to the partial engagement pressure. In this state, the internal combustion engine start control section 46 raises the hydraulic pressure to be supplied to the starting clutch CS to the partial engagement pressure via the starting clutch operation control section 44, which increases the transfer torque capacity Tcs of the starting clutch CS to be equal to or more than the magnitude of driven torque of the internal combustion engine 11. The term "driven torque" of the internal combustion engine 11 refers to torque that needs to be supplied from outside to rotationally drive (crank) the output shaft (crankshaft) of the internal combustion engine 11.

Thereafter, the internal combustion engine start control section 46 rotationally drives (cranks) the internal combustion engine 11 to raise the rotational speed of the internal combustion engine 11 using torque transferred from the rotary electric machine 12 side via the starting clutch CS and capped by the transfer torque capacity Tcs. When the rotational speed of the internal combustion engine 11 rises to reach a rotational speed at which ignition is enabled, the internal combustion engine start control section 46 starts injecting fuel into a combustion chamber of the internal combustion engine 11 and ignites the fuel injected into the combustion chamber to start the internal combustion engine 11. Thereafter, the internal combustion engine 11 performs a self-sustained operation. When the rotational speed of the internal combustion engine 11 further rises and the internal combustion engine 11 and then the rotary electric machine 12 are synchronized with each other, the internal combustion engine start control section 46 raises the hydraulic pressure to be supplied to the starting clutch CS to the complete engagement pressure via the starting clutch operation control section 44 to bring the starting clutch CS into the completely engaged state. Thereafter, the internal combustion engine start control section 46 raises the hydraulic pressure to be supplied to the first clutch C1 to the complete engagement pressure via the speed change mechanism operation control section 45 to bring the first clutch C1 into the completely engaged state. The internal combustion engine start control and the specific slip control are thus terminated.

Even if the starting clutch CS is in the disengaged state, however, a torque loss is actually caused by the drag resistance of oil present around the plurality of friction plates. That is, a viscous friction force due to the viscosity of the oil is generated between an input-side friction plate and an output-side friction plate of the starting clutch CS that rotate relative to each other, and the viscous friction force serves as drag resistance to generate the torque loss. Therefore, if the hydraulic pressure (hydraulic pressure command value Pc1) to be supplied to the first clutch C1 is determined on the basis of only the rotary electric machine torque Tm which is output torque of the rotary electric machine 12 as discussed above at the start of the specific slip control, the magnitude of torque actually input to the input side (friction plate on the intermediate shaft M side) of the first clutch C1 becomes smaller than the transfer torque capacity Tc1 of the first clutch C1 by an amount corresponding to the torque loss due to the drag resistance described above. This results in an issue that the slip state of the first clutch C1 may not be established appropriately or that the establishment of the slip state of the first clutch C1 may be delayed. Such an issue may be especially conspicuous in the case where the starting clutch CS is formed as a wet multi-plate clutch and disposed in a housing that surrounds the starting clutch CS with a plurality of friction plates immersed in oil at all times.

Thus, in order to address such an issue, the present invention implements an improvement in initial setting of the hydraulic pressure to be supplied to the first clutch C1 at the start of the specific slip control executed in the internal combustion engine start control. Concomitantly, intermediate setting of the hydraulic pressure to be supplied to the first clutch C1 during the internal combustion engine start control is also changed. To this end, the drive device control unit 40 according to the embodiment further includes a loss torque estimation section 47, and the speed change mechanism operation control section 45 according to the embodiment further includes a specific-slip hydraulic pressure control section 45b. These functional sections will be described in detail below along with the specific content of an internal combustion engine start process including the specific slip control modified by the present invention.

1-3. Content of Internal Combustion Engine Start Process

Figure 3:
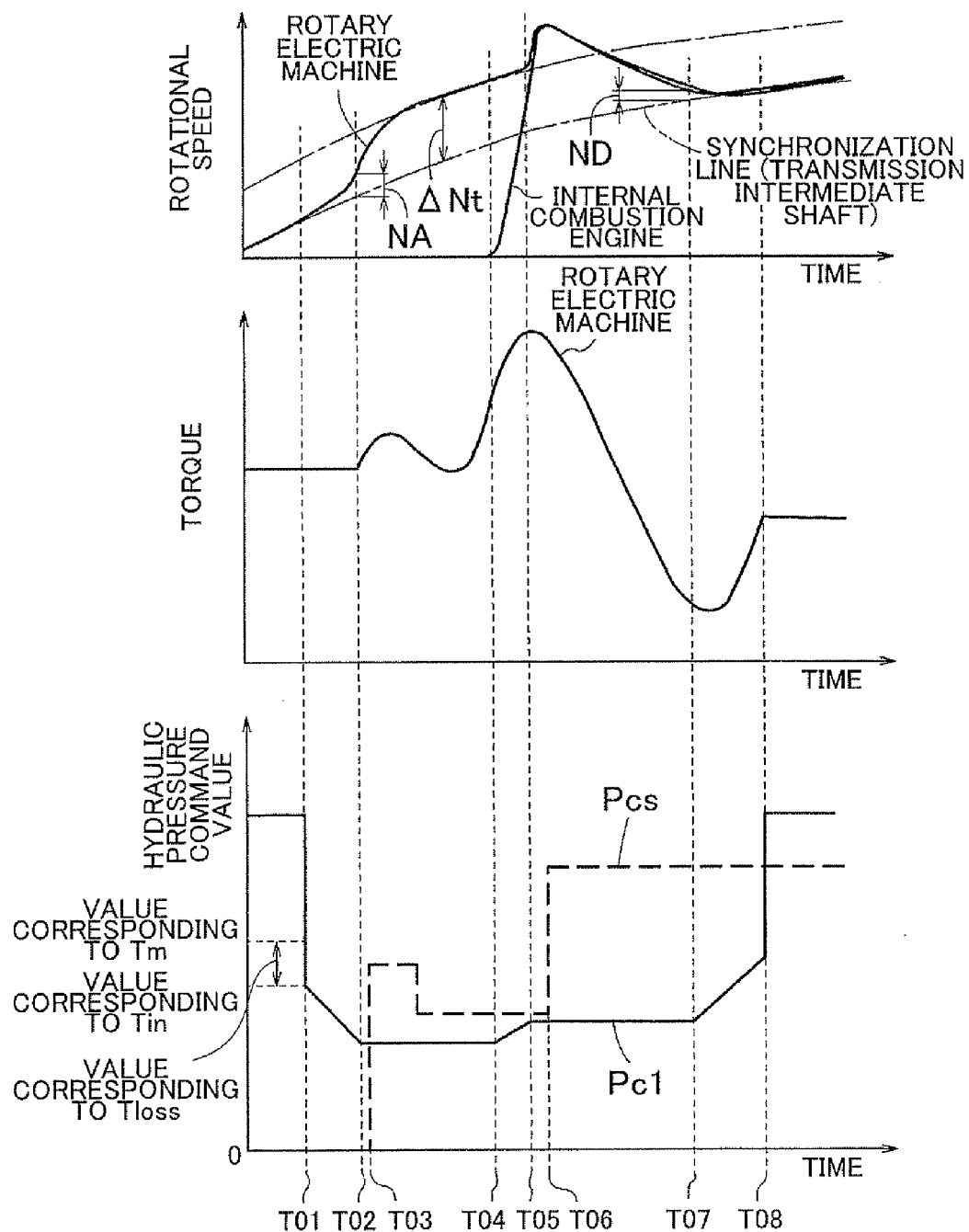
FIG. 3 is a time chart showing an operating state of various components during an internal combustion engine start process.

The specific content of the internal combustion engine start process including the specific slip control according to the embodiment will be described mainly with reference to FIG. 3. In the specific slip control according to the embodiment, estimated loss torque Tloss derived by the loss torque estimation section 47 is used to set the initial value of the hydraulic pressure to be supplied to the first clutch C1 The internal combustion engine start control is executed while executing the specific slip control. The internal combustion engine start process including the specific slip control will be described below in order.

Figure 2:
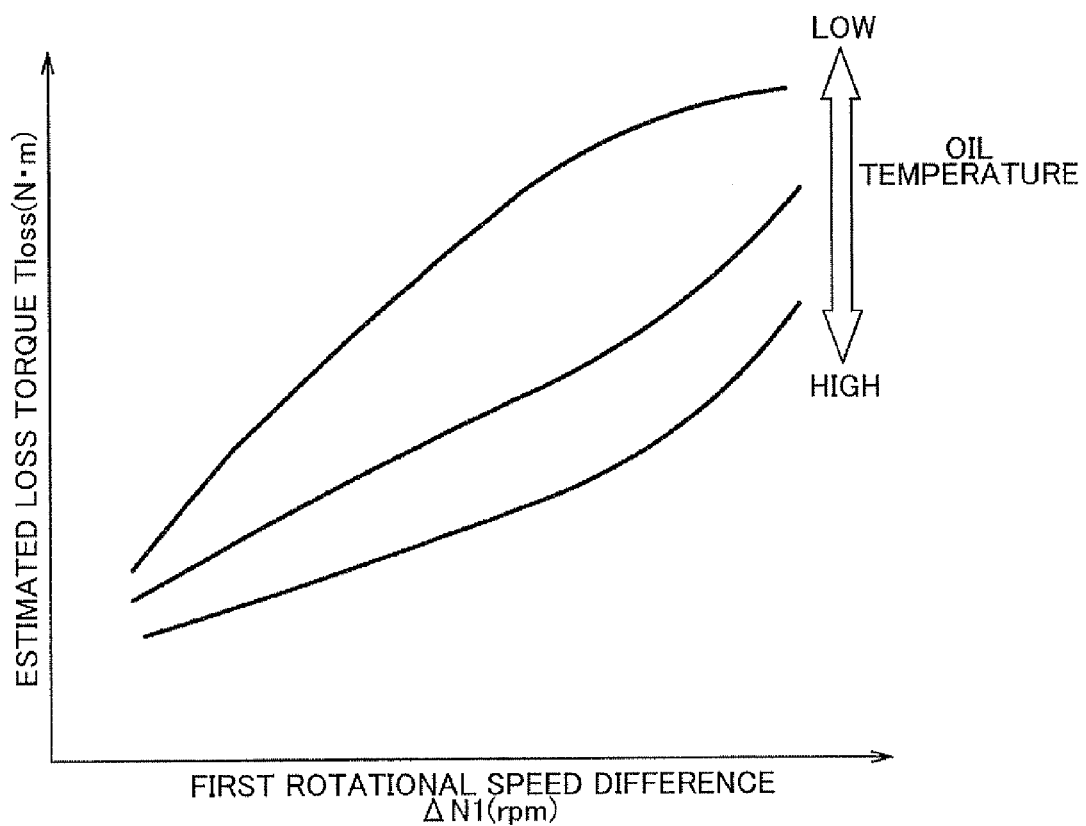
FIG. 2 is a schematic diagram showing an estimated torque map.

The loss torque estimation section 47 is a functional section that derives the estimated loss torque Tloss with the starting clutch CS in the disengaged state. Here, the estimated loss torque Tloss is an estimated value of a torque loss due to the drag resistance with the starting clutch CS in the disengaged state. In the embodiment, the magnitude of the torque loss due to the drag resistance has been experimentally obtained in advance using two parameters, namely the oil temperature of oil to be supplied to the starting clutch CS and a first rotational speed difference $\Delta N1$ between the rotational speed of the internal combustion engine 11 (input shaft I) and the rotational speed of the rotary electric machine 12 (intermediate shaft M). The relationship between the above oil temperature and first rotational speed difference $\Delta N1$ and the estimated loss torque Tloss is stored in the storage device 60 as an estimated torque map 63. An example of the estimated torque map 63 is shown in FIG. 2. In the embodiment, the first rotational speed difference ΔN1 corresponds to the "rotational speed difference" according to the present invention.

As shown in FIG. 2, the estimated loss torque Tloss is set to become higher as the oil temperature of oil to be supplied to the starting clutch CS becomes lower. As described above, the torque loss due to the drag resistance is generated on the basis of the viscous friction force of oil. In general, as the oil temperature becomes lower, the viscosity of oil becomes higher, and therefore the torque loss due to the drag resistance also becomes larger. Accordingly, the magnitude of the estimated loss torque Tloss is set as described above. The estimated loss torque Tloss is set to become higher as the first rotational speed difference ΔN1 becomes larger. In general, as the first rotational speed difference ΔN1 becomes larger, the shearing resistance of oil becomes higher, and therefore the torque loss due to the shearing resistance also becomes larger. Accordingly, the magnitude of the estimated loss torque Tloss is set as described above.

The loss torque estimation section 47 references the estimated torque map 63 to derive the estimated loss torque Tloss on the basis of at least one of the temperature (oil temperature) of oil to be supplied to the starting clutch CS and the first rotational speed difference ΔN1. The temperature of oil to be supplied to the starting clutch CS can be acquired through detection performed by the oil temperature detection sensor Se5. The first rotational speed difference ΔN1 can be acquired through calculation by subtracting the rotational speed of the input shaft I detected by the input shaft rotational speed sensor Se1 from the rotational speed of the intermediate shaft M detected by the intermediate shaft rotational speed sensor Se2. In the embodiment, the loss torque estimation section 47 derives the estimated loss torque Tloss from the estimated torque map 63 using both the acquired oil temperature and first rotational speed difference ΔN1 as arguments. This enables the estimated loss torque Tloss to be derived with high accuracy. The oil temperature varies from moment to moment in accordance with the amount of heat generated by the starting clutch CS and so forth. Also, the first rotational speed difference ΔN1 varies from moment to moment in accordance with variations in respective rotational speeds of the input shaft I and the intermediate shaft M. Hence, the magnitude of the derived estimated loss torque Tloss also varies from moment to moment. The loss torque estimation section 47 derives the estimated loss torque Tloss and outputs information on the derived estimated loss torque Tloss to the specific-slip hydraulic pressure control section 45b at predetermined intervals.

The specific-slip hydraulic pressure control section 45b is a functional section that controls the hydraulic pressure to be supplied to the first clutch C1 in the case where the specific slip control is executed. The specific-slip hydraulic pressure control section 45b is configured to correct at least the hydraulic pressure command value Pc1 for the first clutch C1, which is described above in relation to the basic form of the specific slip control, in consideration of the derived estimated loss torque Tloss in the case where the specific slip control is executed. In the embodiment, the specific-slip hydraulic pressure control section 45b also performs a second correction in consideration of the estimated loss torque Tloss after the rotational speed of the internal combustion engine 11 is raised and before the internal combustion engine 11 and the rotary electric machine 12 are synchronized with each other.

The internal combustion engine start process including the specific slip control according to the embodiment is triggered by the establishment of the predetermined internal combustion engine start conditions. When the internal combustion engine start conditions are met, the specific slip control is executed, and the internal combustion engine start control is executed. At the start of the specific slip control (immediately after the start of the specific slip control; time T01 in FIG. 3), the specific-slip hydraulic pressure control section 45b reduces the hydraulic pressure command value Pc1 for the first clutch C1 stepwise from the complete engagement pressure to a predetermined initial hydraulic pressure. At this time, the specific-slip hydraulic pressure control section 45b achieves the above initial hydraulic pressure by performing a correction so as to reduce the hydraulic pressure command value Pc1 for the first clutch C1 in the basic form (a value corresponding to the rotary electric machine torque Tm) by a magnitude corresponding to the estimated loss torque Tloss at the time point. That is, the specific-slip hydraulic pressure control section 45b sets the hydraulic pressure command value Pc1 for the first clutch C1 such that the transfer torque capacity Tc1 of the first clutch C1 becomes a capacity corresponding to estimated input torque Tin, which is determined as the difference between the rotary electric machine torque Tm and the estimated loss torque Tloss at the time point (Tin=Tm−Tloss), reduces the hydraulic pressure command value Pc1 stepwise to the set value, and causes the hydraulic pressure to be supplied to the first clutch C1 to follow the hydraulic pressure command value Pc1.

Then, after time T01, the specific-slip hydraulic pressure control section 45b reduces the hydraulic pressure command value Pc1 for the first clutch C1 at a constant time variation rate to reduce the hydraulic pressure to be supplied to the first clutch C1 at a constant time variation rate. During this period, the control for the rotary electric machine 12 is switched to torque control, and the rotary electric machine 12 basically outputs the rotary electric machine torque Tm corresponding to the vehicle required torque Td. When the transfer torque capacity Tc1 of the first clutch C1 gradually reduces along with a reduction in hydraulic pressure to be supplied to the first clutch C1, the first clutch C1 starts slipping. The slip state of the first clutch C1 can be determined on the basis of the fact that a second rotational speed difference ΔN2, which is derived on the basis of the rotational speed of the intermediate shaft M serving as one rotary member of the first clutch C1 and the rotational speed of the transmission intermediate shaft S serving as the other rotary member of the first clutch C1 (derived on the basis of the vehicle speed and the speed ratio established in the speed change mechanism 13), is equal to or more than a predetermined slip determination threshold value NA (for example, 10 to 50 rpm).

If the slip state of the first clutch C1 is determined at time T02, the specific-slip hydraulic pressure control section 45b keeps the hydraulic pressure command value Pc1 for the first clutch C1 and the supply hydraulic pressure which follows the hydraulic pressure command value Pc1 stationary at their respective values at the time point, and keeps the transfer torque capacity Tc1 of the first clutch C1 stationary at its value at the time point. In addition, the control for the rotary electric machine 12 is switched to the rotational speed control, and a target rotational speed of the rotary electric machine 12 is set to a value obtained by adding a predetermined target rotational speed difference ΔNt (for example, 50 to 200 rpm) to the rotational speed of the transmission intermediate shaft S serving as an output-side rotary member of the first clutch C1. This allows the first clutch C1 to be appropriately controlled to the slip state with the starting clutch CS in the disengaged state. The target torque of the rotary electric machine 12 is automatically set to achieve the above target rotational speed.

After the slip state of the first clutch C1 is determined, engagement control for the starting clutch CS is started at time T03. Here, after preliminary charge for so-called play filling is performed for a predetermined period, the hydraulic pressure command value Pcs for the starting clutch CS and the supply hydraulic pressure which follows the hydraulic pressure command value Pcs are kept stationary at a value that is equal to or more than a value corresponding to the driven torque of the internal combustion engine 11, and the transfer torque capacity Tcs of the starting clutch CS is kept stationary at a capacity that is equal to or more than the driven torque of the internal combustion engine 11. Thereafter, the internal combustion engine 11 is rotationally driven (cranked) using torque transferred from the rotary electric machine 12 side via the starting clutch CS to raise the rotational speed of the internal combustion engine 11 (time T04 to time T05).

In the embodiment, after the rotational speed of the internal combustion engine 11 starts rising, the specific-slip hydraulic pressure control section 45b performs a correction, starting at time T04 which is the time point immediately thereafter, so as to raise the hydraulic pressure command value Pc1 for the first clutch C1 by a magnitude corresponding to the estimated loss torque Tloss at the time point with respect to the stationary value set at time T02. That is, the specific-slip hydraulic pressure control section 45b raises the hydraulic pressure command value Pc1 for the first clutch C1 and the supply hydraulic pressure which follows the hydraulic pressure command value Pc1 such that the transfer torque capacity Tc1 of the first clutch C1 is increased by a capacity corresponding to the estimated loss torque Tloss at the time point with respect to the stationary value set at time T02. Such a correction for pressure increase by a value corresponding to the estimated loss torque Tloss is performed by raising the hydraulic pressure command value Pc1 for the first clutch C1 and the supply hydraulic pressure which follows the hydraulic pressure command value Pc1 at a constant time variation rate, and completed at time T05 which is before the time point when the internal combustion engine 11 and the rotary electric machine 12 are synchronized with each other. After the completion of the correction for pressure increase by a value corresponding to the estimated loss torque Tloss, the specific-slip hydraulic pressure control section 45b keeps the hydraulic pressure command value Pc1 for the first clutch C1 and the supply hydraulic pressure which follows the hydraulic pressure command value Pc1 stationary at their respective values at the time point, and keeps the transfer torque capacity Tc1 of the first clutch C1 stationary at its value at the time point.

The synchronization between the internal combustion engine 11 and the rotary electric machine 12 can be determined on the basis of the fact that the first rotational speed difference ΔN1 is equal to or less than a predetermined synchronization determination threshold value NC (for example, 10 to 50 rpm; not shown). After the synchronization between the internal combustion engine 11 and the rotary electric machine 12 is determined, at time T06, the hydraulic pressure command value Pcs for the starting clutch CS and the supply hydraulic pressure which follows the hydraulic pressure command value Pcs are raised to the complete engagement pressure to bring the starting clutch CS into the completely engaged state. After the internal combustion engine 11 and the rotary electric machine 12 are synchronized with each other, the respective rotational speeds of the internal combustion engine 11 and the rotary electric machine 12 are temporarily abruptly raised by output torque (internal combustion engine torque Te) of the internal combustion engine 11. However, by setting the target rotational speed difference ΔNt to zero in the rotational speed control for the rotary electric machine 12 thereafter, the second rotational speed difference ΔN2 converges toward zero, and the slip state of the first clutch C1 is to be canceled. The target torque of the rotary electric machine 12 is automatically set to make the second rotational speed difference ΔN2 zero.

Then, when the second rotational speed difference ΔN2 becomes equal to or less than a predetermined synchronization determination threshold value ND (for example, 30 to 100 rpm) at time T07, the specific-slip hydraulic pressure control section 45b raises the hydraulic pressure command value Pc1 for the first clutch C1 and the supply hydraulic pressure which follows the hydraulic pressure command value Pc1 at a constant time variation rate with respect to the stationary value set at time T05. This process is performed continuously for a predetermined period (for example, 100 to 400 ms). Thereafter, at time T08, the specific-slip hydraulic pressure control section 45b raises the hydraulic pressure command value Pc1 for the first clutch C1 and the supply hydraulic pressure which follows the hydraulic pressure command value Pc1 to the complete engagement pressure to bring the first clutch C1 into the completely engaged state. In addition, the control for the rotary electric machine 12 is switched from the rotational speed control to the torque control. The internal combustion engine start process including the specific slip control is thus completed.

1-4. Process Procedures of Internal Combustion Engine Start Process

Figure 4:
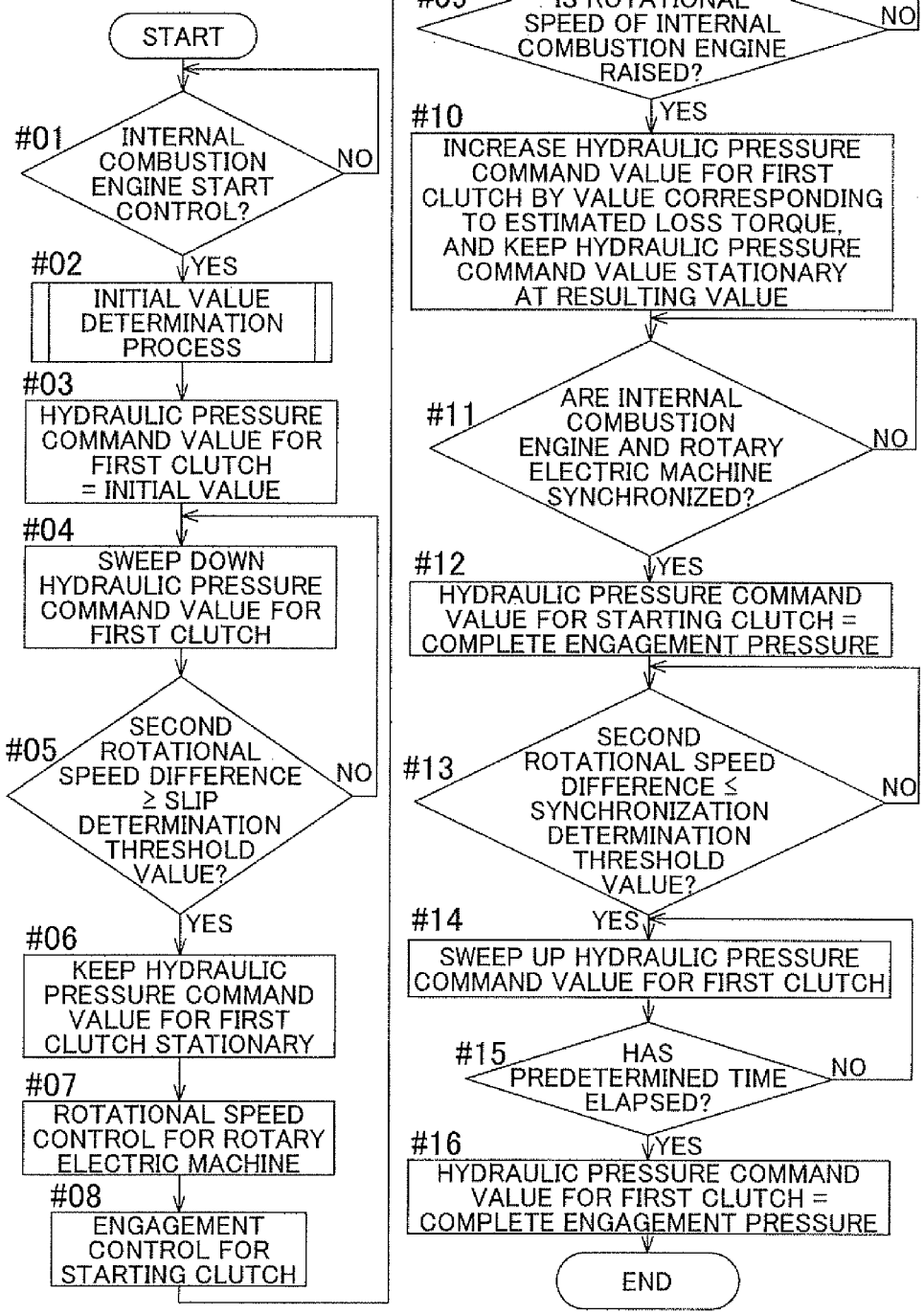
FIG. 4 is a flowchart showing the process procedures of the internal combustion engine start process.
Figure 5:
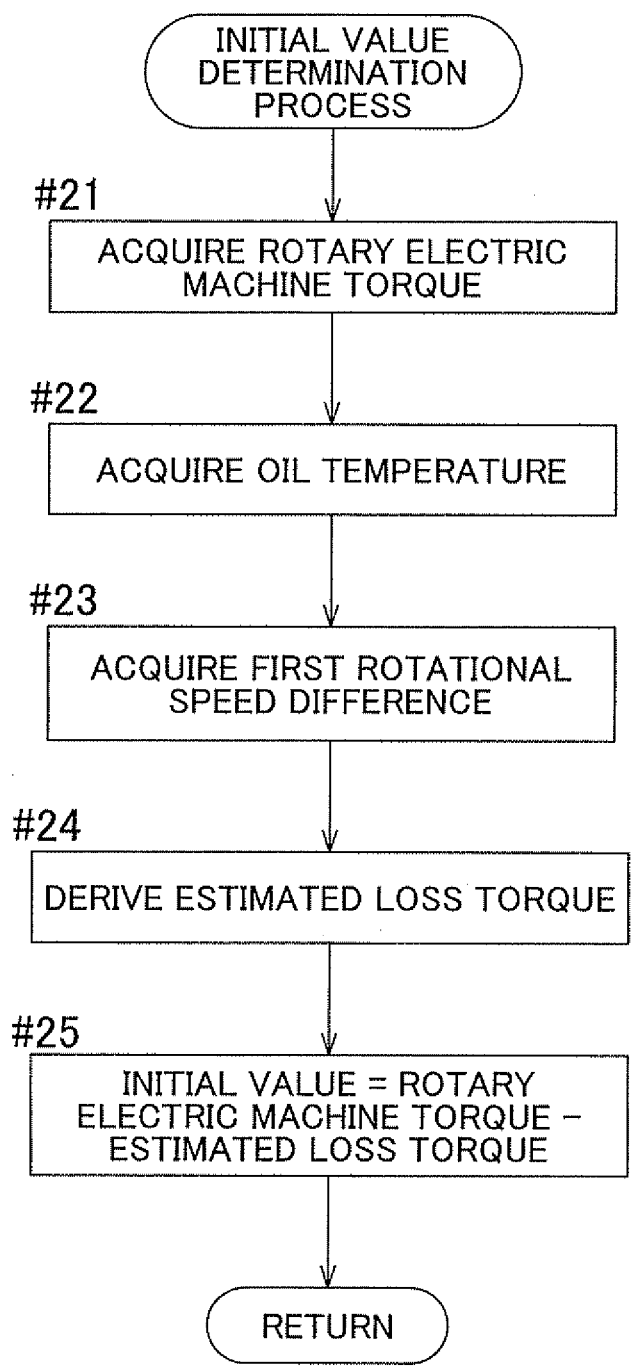
FIG. 5 is a flowchart showing the process procedures of a process for determining an initial value of a hydraulic pressure command value for a first clutch.

Next, the content of the internal combustion engine start process according to the embodiment will be described with reference to the flowcharts of FIGS. 4 and 5. FIG. 4 is a flowchart showing the process procedures of the entire internal combustion engine start process. FIG. 5 is a flowchart showing the process procedures of an initial value determination process performed in step #02 of FIG. 4. The procedures of the internal combustion engine start process described below are executed by the various functional sections of the control device 3. In the case where the functional sections are implemented by a program, the arithmetic processing unit provided in the control device 3 operates as a computer that executes the program implementing the above functional sections.

As shown in FIG. 4, when the internal combustion engine start conditions are met to start the internal combustion engine start control (step #01: Yes), an initial value determination process for determining the initial value of the hydraulic pressure command value Pc1 for the first clutch C1 is executed (step #02). In the initial value determination process, as shown in FIG. 5, the rotary electric machine torque Tm is acquired (step #21). In the embodiment, the rotary electric machine torque Tm is set to the vehicle required torque Td or the maximum rotary electric machine torque Tmmax, depending on the magnitude relationship between the vehicle required torque Td and the maximum rotary electric machine torque Tmmax. The oil temperature and the first rotational speed difference ΔN1 are acquired (steps #22 and #23). The loss torque estimation section 47 references the estimated torque map 63 shown in FIG. 2 to derive the estimated loss torque Tloss on the basis of the acquired oil temperature and first rotational speed difference ΔN1 (step #24). The specific-slip hydraulic pressure control section 45b determines the initial value of the hydraulic pressure command value Pc1 for the first clutch C1 such that the transfer torque capacity Tc1 of the first clutch C1 becomes a capacity corresponding to a value obtained by subtracting the estimated loss torque Tloss derived in step #24 from the rotary electric machine torque Tm acquired in step #21 (step #25). The initial value determination process is thus terminated, and the process returns to step #02.

Returning to FIG. 4, the specific-slip hydraulic pressure control section 45b sets the initial value of the hydraulic pressure command value Pc1 for the first clutch C1 to the value determined in the initial value determination process (step #03). The specific-slip hydraulic pressure control section 45b reduces (sweeps down) the hydraulic pressure command value Pc1 for the first clutch C1 at a constant time variation rate (step #04). The hydraulic pressure command value Pc1 for the first clutch C1 is swept down continuously for a period for which the second rotational speed difference ΔN2 is less than the predetermined slip determination threshold value NA (step #05: No). When the second rotational speed difference ΔN2 becomes equal to or more than the slip determination threshold value NA (step #05: Yes), the specific-slip hydraulic pressure control section 45b keeps the hydraulic pressure command value Pc1 for the first clutch C1 stationary at its value at the time point (step #06). The control for the rotary electric machine 12 is switched to the rotational speed control, and the target rotational speed of the rotary electric machine 12 is set so as to make the second rotational speed difference ΔN2 become the predetermined target rotational speed difference ΔNt (step #07). The engagement control for the starting clutch CS is executed (step #08). Here, after preliminary charge for so-called play filling is performed, the transfer torque capacity Tcs of the starting clutch CS is kept stationary at a capacity that is equal to or more than the driven torque of the internal combustion engine 11.

When the rotational speed of the internal combustion engine 11 starts rising using torque transferred from the rotary electric machine 12 side via the starting clutch CS (step #09: Yes), the specific-slip hydraulic pressure control section 45b increases the hydraulic pressure command value Pc1 for the first clutch C1 by a magnitude corresponding to the estimated loss torque Tloss with respect to the stationary value set in step #06, and keeps the hydraulic pressure command value Pc1 stationary at the resulting value (step #10). After the internal combustion engine 11 and the rotary electric machine 12 are synchronized with each other (step #11: Yes), the starting clutch operation control section 44 adjusts the hydraulic pressure command value Pcs for the starting clutch CS to the complete engagement pressure (step #12). Thereafter, the second rotational speed difference ΔN2 converges toward zero through the rotational speed control for the rotary electric machine 12. When the second rotational speed difference ΔN2 becomes equal to or less than the synchronization determination threshold value ND (step #13: Yes), the specific-slip hydraulic pressure control section 45b raises (sweeps up) the hydraulic pressure command value Pc1 for the first clutch C1 at a constant time variation rate (step #14). The hydraulic pressure command value Pc1 for the first clutch C1 is swept up continuously for a period for which a predetermined time has not elapsed (step #15: No). When the predetermined time has elapsed (step #15: Yes), the specific-slip hydraulic pressure control section 45b adjusts the hydraulic pressure command value Pc1 for the first clutch C1 to the complete engagement pressure (step #16). The internal combustion engine start process is thus terminated.

According to the internal combustion engine start process described above with reference to the time chart of FIG. 3 and the flowcharts of FIGS. 4 and 5, the specific-slip hydraulic pressure control section 45b sets the hydraulic pressure to be supplied to the first clutch C1 such that the transfer torque capacity Tc1 of the first clutch C1 becomes a capacity corresponding to the estimated input torque Tin, which is determined as the difference between the output torque Tm of the rotary electric machine 12 and the estimated loss torque Tloss, at the start of the specific slip control. By reducing the initial value of the transfer torque capacity Tc1 of the first clutch C1 in advance in consideration of the estimated loss torque Tloss as described above, the slip state of the first clutch C1 can be established early when the hydraulic pressure to be supplied to the first clutch C1 is reduced thereafter, at least compared to the case where the transfer torque capacity Tc1 is not corrected in consideration of the estimated loss torque Tloss. The slip state of the first clutch C1 may be established immediately at the same time as the start of the specific slip control, depending on the relationship with the magnitude of the actual torque input to the first clutch C1. Thus, according to the configuration of the embodiment, the slip state of the first clutch C1 can be established early and appropriately when the specific slip control is executed.

In the embodiment, when the hydraulic pressure to be supplied to the first clutch C1 is gradually reduced from the magnitude corresponding to the above estimated input torque Tin and the first clutch C1 starts slipping, the specific-slip hydraulic pressure control section 45b keeps the hydraulic pressure to be supplied to the first clutch C1 stationary at its value at the time point. In this state, the transfer torque capacity Tc1 of the first clutch C1 is balanced against the difference between the rotary electric machine torque Tire and the actual torque loss (including loss torque due to frictional resistance and the actual loss torque due to the drag resistance of the starting clutch CS). Therefore, when the starting clutch CS is brought into the completely engaged state so that the actual drag resistance of the starting clutch CS is completely canceled after the start of the internal combustion engine 11 thereafter, the magnitude of torque actually input to the input side (friction plate on the intermediate shaft M side) of the first clutch C1 may become more than the transfer torque capacity Tc1 of the first clutch C1 by at least a value corresponding to the actual loss torque due to the drag resistance of the starting clutch CS, which may excessively raise the respective rotational speeds of the internal combustion engine 11 and the rotary electric machine 12.

In this respect, according to the embodiment, the specific-slip hydraulic pressure control section 45b raises the hydraulic pressure to be supplied to the first clutch C1 such that the transfer torque capacity Tc1 of the first clutch C1 is increased by a capacity corresponding to the estimated loss torque Tloss after the rotational speed of the internal combustion engine 11 starts rising and before the internal combustion engine 11 and the rotary electric machine 12 are synchronized with each other. This makes it possible to increase the load (travel torque) transferred from the wheel side to the rotary electric machine 12 side via the first clutch C1 by a value corresponding to the estimated loss torque Tloss, and to suppress an excessive rise in respective rotational speeds of the internal combustion engine 11 and the rotary electric machine 12.

At this time, in the embodiment, the specific-slip hydraulic pressure control section 45b raises the hydraulic pressure to be supplied to the first clutch C1 at a constant time variation rate, starting at time T04 which is the time point immediately after the rotational speed of the internal combustion engine 11 starts rising. By adopting such a configuration, the transfer torque capacity Tc1 of the first clutch C1 can be raised at a constant time variation rate which is relatively low. Hence, generation of a shock can be effectively suppressed by gently varying the magnitude of torque to be transferred to the output shaft O side via the first clutch C1 when the hydraulic pressure to be supplied to the first clutch C1 is raised in accordance with the magnitude of the estimated loss torque Tloss.

2. Second Embodiment

Figure 6:
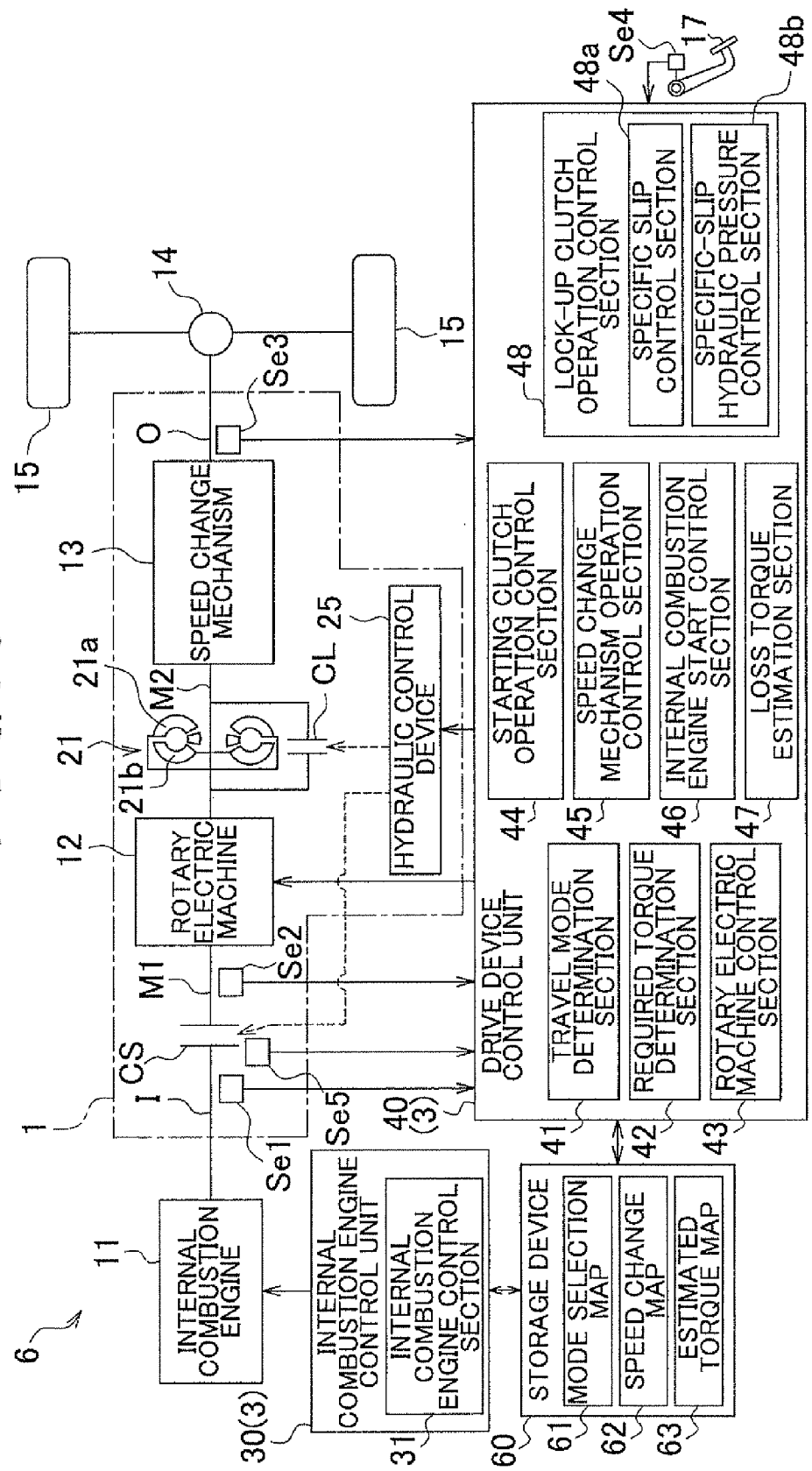
FIG. 6 is a schematic diagram showing the schematic configuration of a drive device and a control device for the drive device according to a second embodiment.

A control device according to a second embodiment of the present invention will be described with reference to the drawings. FIG. 6 is a schematic diagram showing the schematic configuration of the drive device 1 to be controlled by the control device 3 according to the embodiment. The drive device 1 according to the embodiment is different from that according to the above first embodiment in including a torque converter 21 interposed between the rotary electric machine 12 and the speed change mechanism 13. Accordingly, the configuration of the various functional sections provided in the drive device control unit 40 and the content of the internal combustion engine start process are partly different from those according to the above first embodiment. Otherwise, the configuration of the second embodiment is basically the same as that according to the above first embodiment. The differences between the control device 3 according to the embodiment and that according to the above first embodiment will be mainly described below. The same elements as those in the above first embodiment will not be specifically described.

The torque converter 21 is a fluid transmission apparatus that transfers torque transferred to a first intermediate shaft M1 to a second intermediate shaft M2 and the speed change mechanism 13 drivably coupled to the second intermediate shaft M2 via oil filling the fluid transmission apparatus. The torque converter 21 includes a pump impeller 21a drivably coupled to the first intermediate shaft M1, a turbine runner 21b drivably coupled to the second intermediate shaft M2, and a stator provided between the pump impeller 21a and the turbine runner 21b. The torque converter 21 transfers torque between the pump impeller 21a on the driving side and the turbine runner 21b on the driven side via the oil filling the torque converter 21. At this time, torque is converted at a predetermined torque ratio.

The torque converter 21 also includes a lock-up clutch CL serving as a friction engagement element for lock-up. In the embodiment, the lock-up clutch CL is formed as a wet multi-plate clutch. The lock-up clutch CL is provided to selectively drivably couple the pump impeller 21a (first intermediate shaft M1) and the turbine runner 21b (second intermediate shaft M2) to each other. With the lock-up clutch CL in the completely engaged state, the torque converter 21 transfers torque of the first intermediate shaft M1 directly to the second intermediate shaft M2, not via the oil filling the torque converter 21. Thus, the torque converter 21 transfers torque between the first intermediate shaft M1 and the second intermediate shaft M2 via at least one of the lock-up clutch CL and the oil filling the torque converter 21. The second intermediate shaft M2 serves as an input shaft (transmission input shaft) of the speed change mechanism 13. Torque transferred to the second intermediate shaft M2 is transferred to the output shaft O and the wheels 15 via the speed change mechanism 13. In the embodiment, the lock-up clutch CL corresponds to the "second engagement device" according to the present invention.

The drive device control unit 40 according to the embodiment includes a lock-up clutch operation control section 48. The lock-up clutch operation control section 48 is a functional section that controls an operation of the lock-up clutch CL. Here, the lock-up clutch operation control section 48 controls the hydraulic pressure to be supplied to the lock-up clutch CL via the hydraulic control device 25 to control the operation of the lock-up clutch CL. For example, the lock-up clutch operation control section 48 adjusts the hydraulic pressure to be supplied to the lock-up clutch CL to a pressure that is equal to or less than a stroke end pressure to bring the lock-up clutch CL into the disengaged state. Also, the lock-up clutch operation control section 48 adjusts the hydraulic pressure to be supplied to the lock-up clutch CL to a complete engagement pressure to bring the lock-up clutch CL into the completely engaged state.

In addition, the lock-up clutch operation control section 48 adjusts the hydraulic pressure to be supplied to the lock-up clutch CL to a pressure (partial engagement pressure) that is more than the stroke end pressure and less than the complete engagement pressure to bring the lock-up clutch CL into a partially engaged state. With the lock-up clutch CL in the partially engaged state, a drive force is transferred between the first intermediate shaft M1 and the second intermediate shaft M2 with the first intermediate shaft M1 and the second intermediate shaft M2 rotatable relative to each other. That is, with the lock-up clutch CL in the partially engaged state, torque can be transferred with the lock-up clutch CL in the slip state (with the lock-up clutch CL slipping). The magnitude of torque that can be transferred by the lock-up clutch CL in the completely engaged state or the partially engaged state is determined in accordance with the engagement pressure of the lock-up clutch CL at the time point. The magnitude of torque at this time is defined as "transfer torque capacity TcL" of the lock-up clutch CL. In the embodiment, increase and decrease in transfer torque capacity TcL can be continuously controlled by continuously controlling the magnitudes of the amount of oil and the hydraulic pressure to be supplied to the lock-up clutch CL through a proportional solenoid or the like. The direction of torque transferred by the lock-up clutch CL in the slip state is determined in accordance with the direction of relative rotation between the first intermediate shaft M1 and the second intermediate shaft M2.

In the embodiment, the lock-up clutch operation control section 48 includes a specific slip control section 48a and a specific-slip hydraulic pressure control section 48b. Unlike the above first embodiment, the speed change mechanism operation control section 45 does not include the specific slip control section 45a or the specific-slip hydraulic pressure control section 45b, and is configured to perform only normal operation control of the speed change mechanism 13. The specific slip control section 48a is a functional section that executes specific slip control in which the lock-up clutch CL is brought into the slip state with the starting clutch CS in the disengaged state. The function of the specific slip control section 48a is basically the same as the function of the specific slip control section 45a according to the above first embodiment, except that the friction engagement device to be brought into the slip state is the lock-up clutch CL rather than the first clutch C1.

Figure 7:
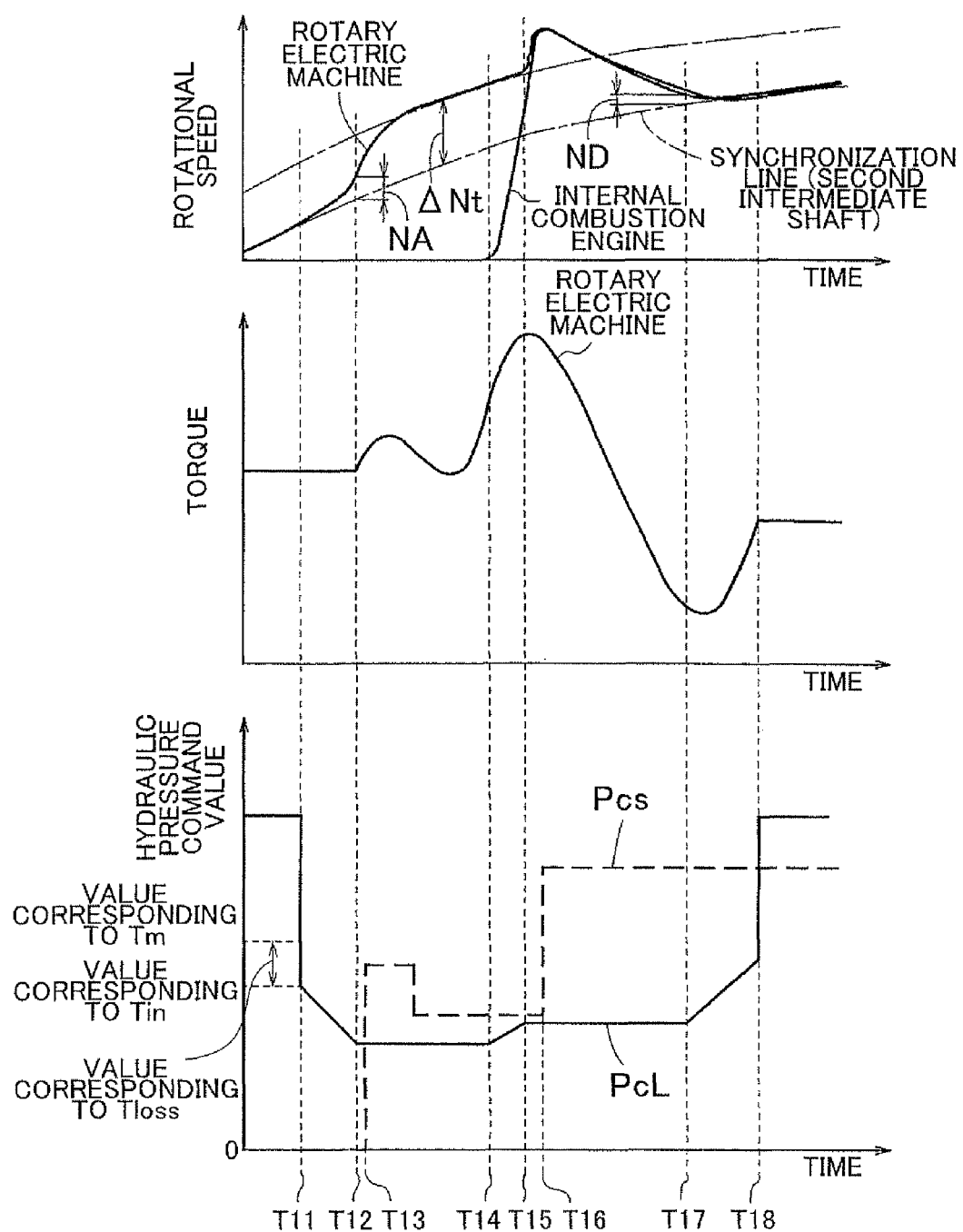
FIG. 7 is a time chart showing an operating state of various components during an internal combustion engine start process.
Figure 8:
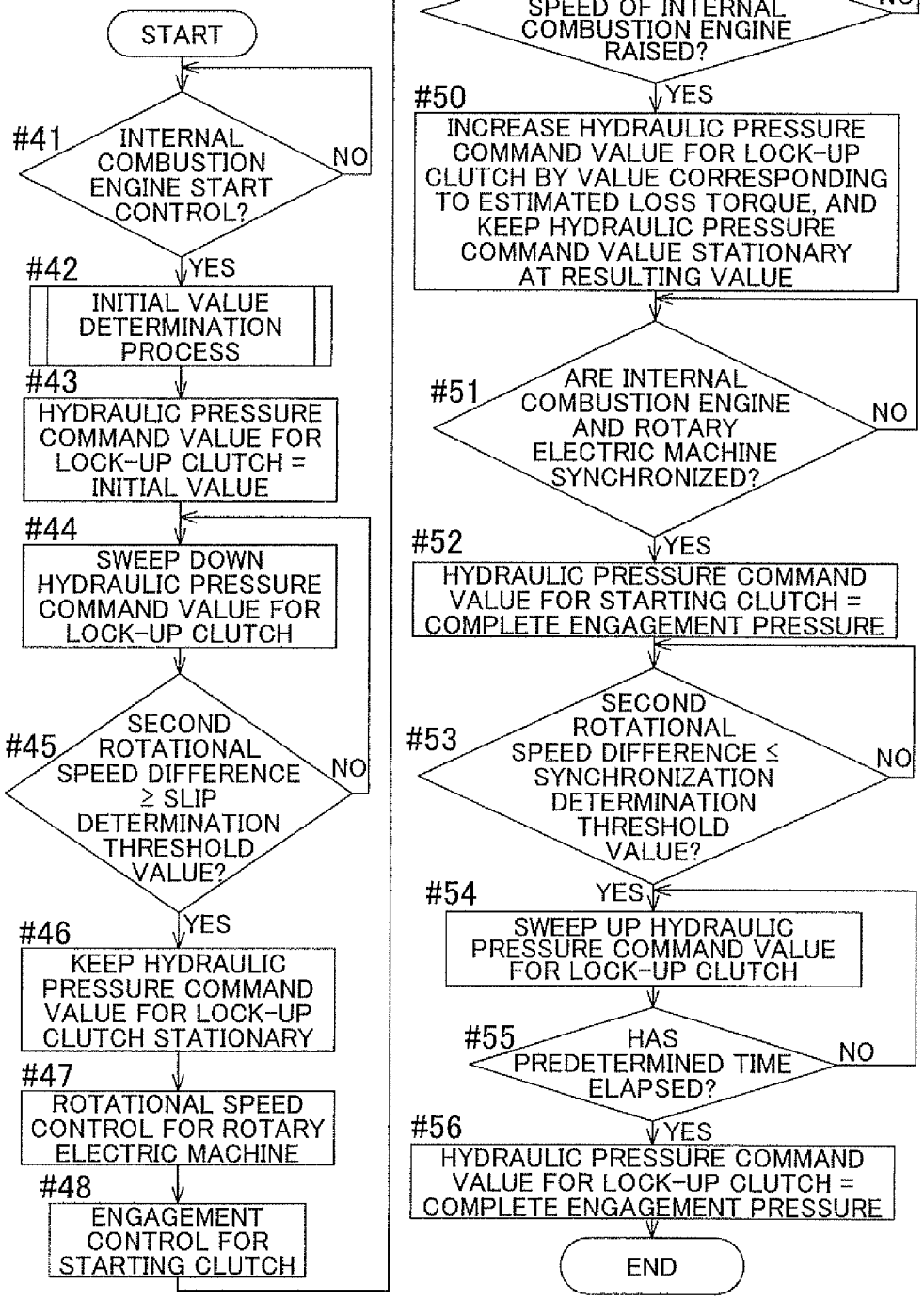
FIG. 8 is a flowchart showing the process procedures of the internal combustion engine start process.

The specific-slip hydraulic pressure control section 48b is a functional section that controls the hydraulic pressure to be supplied to the lock-up clutch CL during execution of the specific slip control. The function of the specific-slip hydraulic pressure control section 48b is also basically the same as the function of the specific-slip hydraulic pressure control section 45b according to the above first embodiment, except that the friction engagement device to be controlled is the lock-up clutch CL rather than the first clutch C1. The function of the specific-slip hydraulic pressure control section 48b can be considered to be generally the same as the function of the specific-slip hydraulic pressure control section 45b according to the above first embodiment when read with the term "first clutch C1" replaced with the term "lock-up clutch CL", "hydraulic pressure command value Pc1" with "hydraulic pressure command value PcL", "transfer torque capacity Tc1" with "transfer torque capacity TcL", "intermediate shaft M" with "first intermediate shaft M1", and "transmission intermediate shaft S" with "second intermediate shaft M2". Thus, only the time chart (FIG. 7) showing the operating state of the various components during the internal combustion engine start process and the flowchart (FIG. 8) showing the process procedures of the internal combustion engine start process are shown here to omit description. According to the configuration of the embodiment, the slip state of the lock-up clutch CL can be established early and appropriately when the specific slip control is executed. In addition, the various functions and effects described in relation to the above first embodiment can be obtained.

3. Third Embodiment

Figure 9:
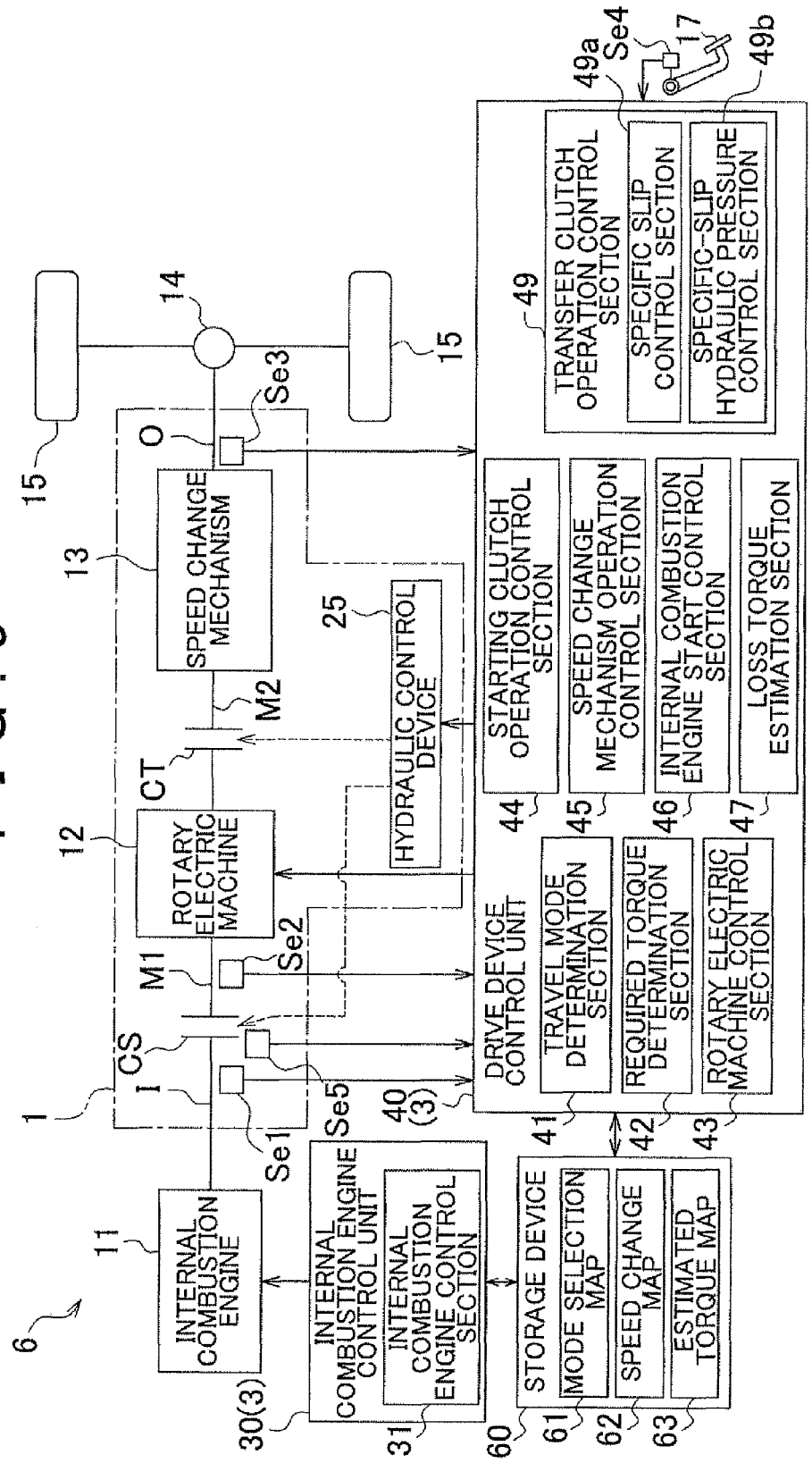
FIG. 9 is a schematic diagram showing the schematic configuration of a drive device and a control device for the drive device according to a third embodiment.

A control device according to a third embodiment of the present invention will be described with reference to the drawings. FIG. 9 is a schematic diagram showing the schematic configuration of the drive device 1 to be controlled by the control device 3 according to the embodiment. The drive device 1 according to the embodiment is different from that according to the above second embodiment in including a transfer clutch CT, in place of the torque converter 21, provided between the rotary electric machine 12 and the speed change mechanism 13. Accordingly, the configuration of the various functional sections provided in the drive device control unit 40 and the content of the internal combustion engine start process are partly different from those according to the above second embodiment. Otherwise, the configuration of the second embodiment is basically the same as that according to the above second embodiment. The differences between the control device 3 according to the embodiment and that according to the above second embodiment will be mainly described below. The same elements as those in the above second embodiment will not be specifically described.

The transfer clutch CT is a friction engagement device provided between the rotary electric machine 12 and the speed change mechanism 13 to selectively drivably couple the first intermediate shaft M1 and the second intermediate shaft M2 to each other. In the embodiment, the transfer clutch CT is formed as a wet multi-plate clutch. In the embodiment, the transfer clutch CT corresponds to the "second engagement device" according to the present invention.

The drive device control unit 40 according to the embodiment includes a transfer clutch operation control section 49 in place of the lock-up clutch operation control section 48. The transfer clutch operation control section 49 is a functional section that controls an operation of the transfer clutch CT. Here, the transfer clutch operation control section 49 controls the hydraulic pressure to be supplied to the transfer clutch CT via the hydraulic control device 25 to control the operation of the transfer clutch CT. For example, the transfer clutch operation control section 49 adjusts the hydraulic pressure to be supplied to the transfer clutch CT to a pressure that is equal to or less than a stroke end pressure to bring the transfer clutch CT into the disengaged state. Also, the transfer clutch operation control section 49 adjusts the hydraulic pressure to be supplied to the transfer clutch CT to a complete engagement pressure to bring the transfer clutch CT into the completely engaged state.

In addition, the transfer clutch operation control section 49 adjusts the hydraulic pressure to be supplied to the transfer clutch CT to a pressure (partial engagement pressure) that is more than the stroke end pressure and less than the complete engagement pressure to bring the transfer clutch CT into a partially engaged state. With the transfer clutch CT in the partially engaged state, a drive force is transferred between the first intermediate shaft M1 and the second intermediate shaft M2 with the first intermediate shaft M1 and the second intermediate shaft M2 rotatable relative to each other. That is, with the transfer clutch CT in the partially engaged state, torque can be transferred with the transfer clutch CT in the slip state (with the transfer clutch CT slipping). The magnitude of torque that can be transferred by the transfer clutch CT in the completely engaged state or the partially engaged state is determined in accordance with the engagement pressure of the transfer clutch CT at the time point. The magnitude of torque at this time is defined as "transfer torque capacity Tct" of the transfer clutch CT. In the embodiment, increase and decrease in transfer torque capacity Tct can be continuously controlled by continuously controlling the magnitudes of the amount of oil and the hydraulic pressure to be supplied to the transfer clutch CT through a proportional solenoid or the like. The direction of torque transferred by the transfer clutch CT in the slip state is determined in accordance with the direction of relative rotation between the first intermediate shaft M1 and the second intermediate shaft M2.

In the embodiment, the transfer clutch operation control section 49 includes a specific slip control section 49a and a specific-slip hydraulic pressure control section 49b. The specific slip control section 49a is a functional section that executes specific slip control in which the transfer clutch CT is brought into the slip state with the starting clutch CS in the disengaged state. The function of the specific slip control section 49a is basically the same as the function of the specific slip control section 48a according to the above second embodiment, except that the friction engagement device to be brought into the slip state is the transfer clutch CT rather than the lock-up clutch CL.

The specific-slip hydraulic pressure control section 49b is a functional section that controls the hydraulic pressure to be supplied to the transfer clutch CT during execution of the specific slip control. The function of the specific-slip hydraulic pressure control section 49b is also basically the same as the function of the specific-slip hydraulic pressure control section 48b according to the above second embodiment, except that the friction engagement device to be controlled is the transfer clutch CT rather than the lock-up clutch CL. The function of the specific-slip hydraulic pressure control section 49b can be considered to be generally the same as the function of the specific-slip hydraulic pressure control section 48b according to the above second embodiment when read with the term "lock-up clutch CL" replaced with the term "transfer clutch CT", "hydraulic pressure command value PcL" with "hydraulic pressure command value Pct", and "transfer torque capacity TcL" with "transfer torque capacity Tct". Thus, according to the configuration of the embodiment, the slip state of the transfer clutch CT can be established early and appropriately when the specific slip control is executed, although not described in detail here. In addition, the various functions and effects described in relation to the above first and second embodiments can be obtained.

4. Other Embodiments

Lastly, control devices according to other embodiments of the present invention will be described. A configuration disclosed in each of the following embodiments may be applied not only to that particular embodiment but also in combination with a configuration disclosed in any other embodiment unless any contradiction occurs.

(1) In the above embodiments, the loss torque estimation section 47 references the estimated torque map 63 to derive the estimated loss torque Tloss on the basis of the temperature of oil to be supplied to the starting clutch CS and the first rotational speed difference ΔN1. However, the present invention is not limited thereto. That is, in one preferred embodiment of the present invention, the loss torque estimation section 47 may be configured to derive the estimated loss torque Tloss through calculation based on a predetermined computation formula that uses the temperature of oil to be supplied to the starting clutch CS and the first rotational speed difference ΔN1 as variables, for example.

(2) In the above embodiments, the loss torque estimation section 47 derives the estimated loss torque Tloss on the basis of both the temperature of oil to be supplied to the starting clutch CS and the first rotational speed difference ΔN1. However, the present invention is not limited thereto. That is, in one preferred embodiment of the present invention, the loss torque estimation section 47 may be configured to derive the estimated loss torque Tloss on the basis of only one of the temperature of oil to be supplied to the starting clutch. CS and the first rotational speed difference ΔN1, for example. In this case, it is suitable that the estimated loss torque Tloss is set to become higher as the temperature of oil to be supplied to the starting clutch CS becomes lower, or set to become higher as the first rotational speed difference ΔN1 becomes larger, for example.

Alternatively, the loss torque estimation section 47 may be configured to derive the estimated loss torque Tloss further on the basis of other parameters. In this case, it is conceivable to use the amount of oil to be supplied to the starting clutch CS, the period of use of the starting clutch CS, or the like as the other parameters, for example.

(3) In the above embodiments, at the start of the specific slip control (immediately after the start of the specific slip control), the specific-slip hydraulic pressure control section 45b reduces the hydraulic pressure command value Pc1 for the first clutch C1 stepwise from the complete engagement pressure to a predetermined initial hydraulic pressure. However, the present invention is not limited thereto. That is, in one preferred embodiment of the present invention, the specific-slip hydraulic pressure control section 45b may be configured to reduce the hydraulic pressure command value Pc1 for the first clutch C1 after a predetermined period elapses after the start of the specific slip control. Alternatively, in one preferred embodiment of the present invention, the specific-slip hydraulic pressure control section 45b may be configured to gradually reduce the hydraulic pressure command value Pc1 for the first clutch C1 at a predetermined time variation rate from the complete engagement pressure to a predetermined initial hydraulic pressure. In this case, the absolute value of the time variation rate is preferably set to a sufficiently large value compared to the absolute value of the time variation rate at which the hydraulic pressure command value Pc1 for the first clutch C1 is swept down after the hydraulic pressure command value Pc1 is set to the initial hydraulic pressure (time T01 to time T02) as described in relation to the above embodiments.

(4) In the above embodiments, the specific-slip hydraulic pressure control section 45b raises, starting at the time point immediately after the rotational speed of the internal combustion engine 11 starts rising, the hydraulic pressure to be supplied to the first clutch C1 by a magnitude corresponding to the estimated loss torque Tloss at the time point. However, the present invention is not limited thereto. That is, the specific-slip hydraulic pressure control section 45b may start raising the hydraulic pressure to be supplied to the first clutch C1 at any time point between the time point when the rotational speed of the internal combustion engine 11 starts rising and the time point when the internal combustion engine 11 and the rotary electric machine 12 are synchronized with each other.

(5) In the above embodiments, the specific-slip hydraulic pressure control section 45b raises the hydraulic pressure to be supplied to the first clutch C1 by a magnitude corresponding to the estimated loss torque Tloss at a constant time variation rate. However, the present invention is not limited thereto. That is, in one preferred embodiment of the present invention, the hydraulic pressure to be supplied to the first clutch C1 may be raised at different time variation rates in initial and later stages, for example. In this case, it is conceivable that the time variation rate in the later stage is lower than the time variation rate in the initial stage, for example. Alternatively, in one preferred embodiment of the present invention, the hydraulic pressure to be supplied to the first clutch C1 may be raised stepwise by a value corresponding to the estimated loss torque Tloss at any time point between the time point when the rotational speed of the internal combustion engine 11 starts rising and the time point when the internal combustion engine 11 and the rotary electric machine 12 are synchronized with each other, for example.

In one preferred embodiment of the present invention, the specific-slip hydraulic pressure control section 45b may be configured not to execute at all a second correction in which the hydraulic pressure to be supplied to the first clutch C1 is raised by a magnitude corresponding to the estimated loss torque Tloss.

(6) In the above first embodiment, the specific slip control is executed in the internal combustion engine start process. However, the specific slip control according to the present invention is not limited to application to such control. That is, in a configuration in which the first clutch C1 for shifting provided in the speed change mechanism 13 is used as the "second engagement device" which is brought into the slip state in the specific slip control as in the above first embodiment, the specific slip control may be applied to the speed change control performed during travel in the electric power travel mode. In a configuration in which the torque converter 21 including the lock-up clutch CL or the transfer clutch CT is provided as in the above second and third embodiments, the first clutch C1 for shifting provided in the speed change mechanism 13 may be used as the "second engagement device", and the specific slip control may be applied to the speed change control performed during travel in the electric power travel mode in the same way as described above. In these cases, the slip state of the first clutch C1 can be established early and appropriately in torque phase of the speed change control, and thus advantageously the speed change control can be executed quickly and appropriately.

(7) In the above embodiments, the starting clutch CS is formed as a wet multi-plate clutch. However, the present invention is not limited thereto. That is, it is also suitable that the starting clutch CS is formed as a dry single-plate clutch, for example. Also in this case, even if the starting clutch CS is in the disengaged state, a torque loss may be actually caused by the drag resistance of air present around the starting clutch CS. Hence, by adopting a configuration such as that described in relation to the above embodiments, the slip state of the first clutch C1 or the like can be established early and appropriately when the specific slip control is executed. It is likewise suitable that the starting clutch CS is formed as a wet single-plate clutch, a dry multi-plate clutch, or the like.

Whether the starting clutch CS is a wet clutch or a dry clutch, a torque loss due to the resistance in a rotary/slide portion in the starting clutch CS itself or in a drive system between the starting clutch CS and the internal combustion engine 11 may be caused. Thus, it is also suitable that the loss torque estimation section 47 is configured to derive the estimated loss torque in consideration of such a torque loss.

(8) In the above first embodiment, in the drive device 1 to be controlled by the control device 3, the first clutch C1 for shifting provided in the speed change mechanism 13 is used as the "second engagement device". However, the present invention is not limited thereto. That is, in one preferred embodiment of the present invention, a friction engagement device such as other clutches and brakes provided in the speed change mechanism 13 may be used as the "second engagement device", for example.

(9) In the above second and third embodiments, in the drive device 1 to be controlled by the control device 3, the speed change mechanism 13 is formed as a stepped automatic transmission. However, the present invention is not limited thereto. That is, in the case where the lock-up clutch CL or the transfer clutch CT is provided as the "second engagement device", the speed change mechanism 13 with any configuration may be adopted. In one preferred embodiment of the present invention, an automatic continuously variable transmission with a continuously variable speed ratio, a manual stepped transmission that switchably provides a plurality of shift speeds with different speed ratios, or the like may be used as the speed change mechanism 13, for example.

(10) In the above second and third embodiments, the starting clutch CS, the rotary electric machine 12, the lock-up clutch CL (or the transfer clutch CT), and the speed change mechanism 13 are provided on the power transfer path connecting between the input shaft I and the output shaft O, and arranged in this order from the side of the input member I. However, the present invention is not limited thereto. That is, the speed change mechanism 13 may be provided at any position as long as at least the starting clutch CS, the rotary electric machine 12, and the lock-up clutch CL (or the transfer clutch CT) are arranged in this order.

(11) In the above embodiments, the control device 3 includes the internal combustion engine control unit 30 that mainly controls the internal combustion engine 11, and the drive device control unit 40 that mainly controls the rotary electric machine 12, the starting clutch CS, and the speed change mechanism 13. However, the present invention is not limited thereto. That is, in one preferred embodiment of the present invention, the single control device 3 may be configured to control all of the internal combustion engine 11, the rotary electric machine 12, the starting clutch CS, the speed change mechanism 13, and so forth, for example. Alternatively, in one preferred embodiment of the present invention, the control device 3 may be configured to include individual control units that control the internal combustion engine 11, the rotary electric machine 12, and various other components, respectively.

(12) Also regarding other configurations, the embodiments disclosed herein are illustrative in all respects, and the present invention is not limited thereto. That is, it is a matter of course that a configuration obtained by appropriately altering part of a configuration not disclosed in the claims of the present invention also falls within the technical scope of the present invention as long as the resulting configuration includes a configuration disclosed in the claims or a configuration equivalent thereto.

The present invention may be suitably applied to a control device that controls a drive device in which a first engagement device, a rotary electric machine, and a second engagement device are provided on a power transfer path connecting between an input member drivably coupled to an internal combustion engine and an output member drivably coupled to wheels and are arranged in this order from the side of the input member.

What is claimed is:

1. A control device that controls a drive device in which a first engagement device, a rotary electric machine, and a second engagement device are provided on a power transfer path connecting between an input member drivably coupled to an internal combustion engine and an output member drivably coupled to wheels and are arranged in this order from a side of the input member, the control device comprising:

a loss torque estimation section that derives estimated loss torque, which is an estimated value of loss torque due to drag resistance of the first engagement device, with the first engagement device in a disengaged state; and a specific-slip hydraulic pressure control section that sets a hydraulic pressure to be supplied to the second engagement device such that a transfer torque capacity of the second engagement device becomes a capacity corresponding to estimated input torque, which is determined as a difference between output torque of the rotary electric machine and the estimated loss torque in the process of controlling the second engagement device from a completely engaged state to a slip state, in the case where specific slip control, in which the second engagement device is controlled to a slip state from a state with the first engagement device in the disengaged state and with the second engagement device in a completely engaged state, is executed.

2. The control device according to claim 1, wherein
in the specific slip control, the specific-slip hydraulic pressure control section reduces the hydraulic pressure to be supplied to the second engagement device to an initial hydraulic pressure corresponding to the estimated input torque, and thereafter reduces the hydraulic pressure to be supplied to the second engagement device from the initial hydraulic pressure at a constant time variation rate until a difference in rotational speed between one rotary member and the other rotary member of the second engagement device becomes a predetermined value.

3. The control device according to claim 1, wherein:
the control device is configured to be capable of executing internal combustion engine start control, in which the internal combustion engine is started using torque of the rotary electric machine, while executing the specific slip control with the internal combustion engine in a stationary state; and
the specific-slip hydraulic pressure control section raises the hydraulic pressure to be supplied to the second engagement device so as to increase the transfer torque capacity of the second engagement device by a capacity corresponding to the estimated loss torque during the internal combustion engine start control after a rotational speed of the input member starts rising and before the rotational speed of the input member and a rotational speed of the rotary electric machine become equal to each other.

4. The control device according to claim 3, wherein
the specific-slip hydraulic pressure control section raises the hydraulic pressure to be supplied to the second engagement device at a constant time variation rate for a predetermined period at and after a time point when the rotational speed of the input member starts rising.

5. The control device according to claim 1, wherein
the loss torque estimation section derives the estimated loss torque on the basis of at least one of a temperature of a fluid in which the first engagement device is immersed and a rotational speed difference between the rotational speed of the input member and the rotational speed of the rotary electric machine.

6. The control device according to claim 5, wherein the estimated loss torque is set to become higher as the temperature of the fluid in which the first engagement device is immersed becomes lower.

7. The control device according to claim 5, wherein the estimated loss torque is set to become higher as the rotational speed difference becomes larger.

8. The control device according to claim 1, wherein the second engagement device is a clutch.

9. A control device that controls a drive device in which a first engagement device, a rotary electric machine, and a second engagement device are provided on a power transfer path connecting between an input member drivably coupled to an internal combustion engine and an output member drivably coupled to wheels and are arranged in this order from a side of the input member, the control device comprising:

a loss torque estimation section that derives estimated loss torque, which is an estimated value of loss torque due to drag resistance of the first engagement device, with the first engagement device in a disengaged state; and a specific-slip hydraulic pressure control section that sets a hydraulic pressure to be supplied to the second engagement device such that a transfer torque capacity of the second engagement device becomes a capacity corresponding to estimated input torque, which is determined as a difference between output torque of the rotary electric machine and the estimated loss torque in the process of controlling the second engagement device from a completely engaged state to a slip state, in the case where specific slip control, in which the second engagement device is controlled to an early slip state from a state with the first engagement device in the disengaged state and with the second engagement device in a completely engaged state, is executed.

* * * * *